United States Patent
Mukasa et al.

(10) Patent No.: US 8,509,041 B2
(45) Date of Patent: Aug. 13, 2013

(54) RECORDING APPARATUS AND RECORDING METHOD

(75) Inventors: Tomoharu Mukasa, Saitama (JP); Yoshiyuki Urakawa, Kanagawa (JP); Noriaki Nishi, Kanagawa (JP); Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/527,838

(22) Filed: Jun. 20, 2012

(65) Prior Publication Data

US 2013/0010580 A1 Jan. 10, 2013

(30) Foreign Application Priority Data

Jul. 4, 2011 (JP) ................. 2011-148056

(51) Int. Cl.
 *G11B 7/00* (2006.01)
(52) U.S. Cl.
 USPC ................. 369/44.14; 369/44.25; 369/44.26; 369/53.23; 369/94
(58) Field of Classification Search
 USPC .......... 369/44.14, 44.25, 44.26, 53.23, 53.28, 369/94, 103
 See application file for complete search history.

(56) References Cited

U.S. PATENT DOCUMENTS

| 2011/0134729 A1* | 6/2011 | Ishimoto | 369/44.11 |
| 2012/0113775 A1* | 5/2012 | Horigome | 369/44.14 |
| 2012/0113776 A1* | 5/2012 | Horigome et al. | 369/44.14 |

FOREIGN PATENT DOCUMENTS

| JP | 2008-135144 A | 6/2008 |
| JP | 2008-176902 A | 7/2008 |

* cited by examiner

*Primary Examiner* — Wayne Young
*Assistant Examiner* — Brenda Bernardi
(74) *Attorney, Agent, or Firm* — Wolf, Greenfield & Sacks, P.C.

(57) ABSTRACT

Provided is a recording apparatus including a light irradiation and receiving unit configured to irradiate recording light for performing mark recording to a recording layer and an adjacent servo light for an adjacent track servo onto an optical disc recording medium having the recording layer through a common objective lens, and to receive reflected light from the recording layer of the adjacent servo light, a tracking mechanism configured to drive the objective lens in a tracking direction which is the disc radial direction, a tracking servo signal generation unit configured to obtain a corrected servo error signal as a servo error signal based on a light receiving signal for the adjacent servo light, and to generate a tracking servo signal using the corrected servo error signal, and a tracking driving unit configured to drive the tracking mechanism based on the tracking servo signal.

9 Claims, 19 Drawing Sheets

AT THE TIME OF RECORDING

AFTER ONE ROTATION OF DISC

OPEN LOOP CHARACTERISTICS

CLOSED LOOP CHARACTERISTICS

FIG.7
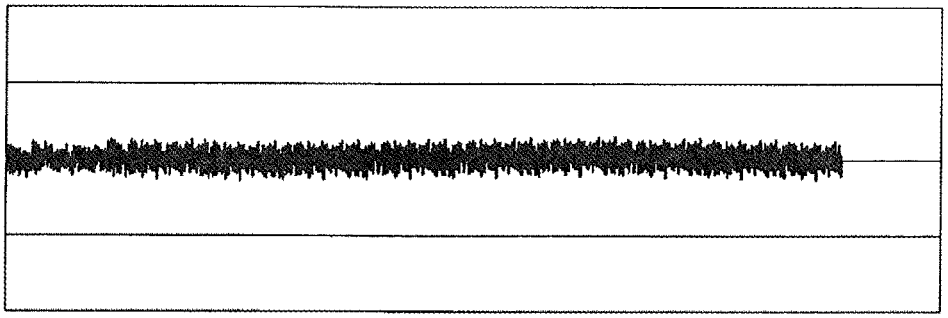
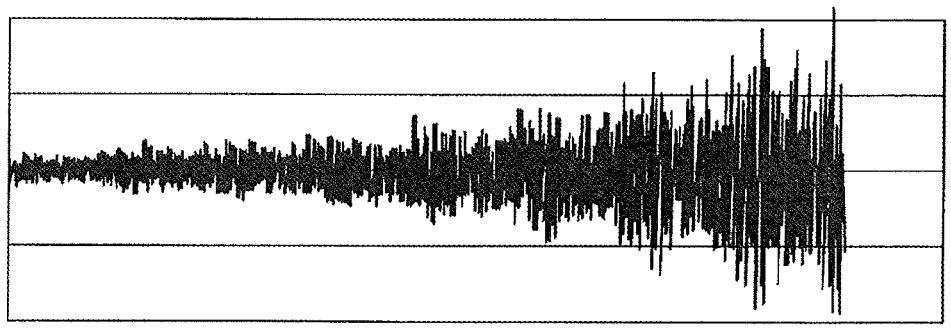

RECORDING APPARATUS AND RECORDING METHOD

CROSS REFERENCES TO RELATED APPLICATIONS

The present application claims priority to Japanese Priority Patent Application JP 2011-148056 filed in the Japan Patent Office on Jul. 4, 2011, the entire content of which is hereby incorporated by reference.

BACKGROUND

The present disclosure relates to a recording apparatus and a recording method, which perform recording by performing an adjacent track servo with respect to an optical disc recording medium.

As an optical disc recording medium (an optical disc) for which recording and reproduction of signals are performed through light irradiation, for example, a compact disc (CD), a digital versatile disc (DVD), a Blu-ray disc (BD, a registered trademark) and the like have been widely used.

In relation to a next generation optical disc to optical discs such as a CD, a DVD, or a BD which are currently in wide use, the present applicant has proposed a bulk recording-type optical disc as disclosed in Japanese Unexamined Patent Application Publication No. 2008-135144 and Japanese Unexamined Patent Application Publication No. 2008-176902.

Here, the bulk recording represents technology for changing a sequential focus position and irradiating a laser beam onto an optical recording medium (a bulk type recording medium) having at least a cover layer and a bulk layer (a recording layer), thereby performing multilayer recording in the bulk layer and thus achieving large recording capacity.

SUMMARY

In light of the foregoing, it is desirable to perform a tracking servo operation suitable for large capacity recording in order to achieve an optical disc with a large capacity such as a bulk recording-type optical disc.

Specifically, it is desirable to provide technology suitable for a tracking scheme using an adjacent track servo by irradiating a recording light and an adjacent servo light for the adjacent track servo onto an optical disc.

A recording apparatus of the present disclosure includes a light irradiation and receiving unit configured to irradiate recording light for performing mark recording to a recording layer and an adjacent servo light for an adjacent track servo onto an optical disc recording medium having the recording layer through a common objective lens, and to receive reflected light from the recording layer of the adjacent servo light, the adjacent servo light having an irradiation position different from a position in a disc circumferential direction of the recording light and being separated from the recording light by a predetermined distance in a disc radial direction, a tracking mechanism configured to drive the objective lens in a tracking direction which is the disc radial direction, a tracking servo signal generation unit configured to obtain a corrected servo error signal as a servo error signal based on a light receiving signal for the adjacent servo light, and to generate a tracking servo signal using the corrected servo error signal, the corrected servo error signal being obtained when the adjacent servo light has been irradiated in a same position in the disc circumferential direction as a position of the recording light, and a tracking driving unit configured to drive the tracking mechanism based on the tracking servo signal.

A recording method of the present disclosure includes irradiating recording light for performing mark recording to a recording layer and adjacent servo light for an adjacent track servo onto an optical disc recording medium having the recording layer through a common objective lens, and receiving reflected light from the recording layer of the adjacent servo light, the adjacent servo light having an irradiation position different from a position in a disc circumferential direction of the recording light and being separated from the recording light by a predetermined distance in a disc radial direction, obtaining a corrected servo error signal as a servo error signal based on a light receiving signal for the adjacent servo light, and generating a tracking servo signal using the corrected servo error signal, the corrected servo error signal being obtained when the adjacent servo light has been irradiated in a same position in the disc circumferential direction as a position of the recording light, and performing a tracking servo for driving the objective lens in a tracking direction, which is the disc radial direction, based on the tracking servo signal, and performing mark recording to the recording layer using the recording light.

In this present disclosure, as a tracking servo scheme at the time of recording for the optical disc, a tracking servo operation using an adjacent track servo is performed.

The adjacent track servo represents a scheme of performing recording using a recording light irradiated into a position adjacent to an adjacent servo light, in the state in which the adjacent servo light has tracked a previously recorded track. In this way, it is possible to form a new track along the previously recorded track, that is, form a mark string through mark recording, with respect to a recording medium having no tracks.

In addition, the adjacent track servo is also called ATS (Adjacent Track Servo).

The adjacent servo light represents a light of reproduction power for tracing a previously formed track in an adjacent track servo (ATS) operation. The adjacent servo light is also called an "ATS light".

In the adjacent track servo, the recording light and the adjacent servo light (a reproduction light) are irradiated. However, if the recording light and the adjacent servo light are arranged in the radial direction, since the distance between both spots thereof is a track pitch, there is a limitation in obtaining a narrow track pitch. In this regard, in order to obtain the narrow track pitch for large capacity, the recording light and the adjacent servo light are irradiated such that spots of the recording light and the adjacent servo light are arranged at different positions as positions in the disc circumferential direction (angular positions when viewed from a disc center). However, in this case, due to the remainder of a servo error component generated by the difference in the positions in the circumferential direction of the recording light and the adjacent servo light, a tracking servo is unstable.

In this regard, in the present disclosure, a corrected servo error signal, which is to be obtained when the adjacent servo light has been irradiated at the same position as the position in the disc circumferential direction of the recording light, is obtained as a servo error signal based on a light receiving signal of the adjacent servo light, and a tracking servo signal is generated using the corrected servo error signal, thereby performing tracking servo control. In this way, it is possible to stabilize a tracking servo while obtaining a narrow track pitch.

According to the present disclosure, it is possible to reduce the remainder of a tracking error component generated by the difference in the positions in the circumferential direction of the recording light and the adjacent servo light (the ATS light) in the adjacent track servo operation, and to obtain a stable tracking servo. In this way, the present disclosure is suitable for the large capacity of a disc recording medium.

BRIEF DESCRIPTION OF THE DRAWINGS

FIG. 7 is a diagram for explaining the shape of divergence of a remainder amount based on an adjacent track servo;

DETAILED DESCRIPTION OF THE EMBODIMENT(S)

Figure 1:
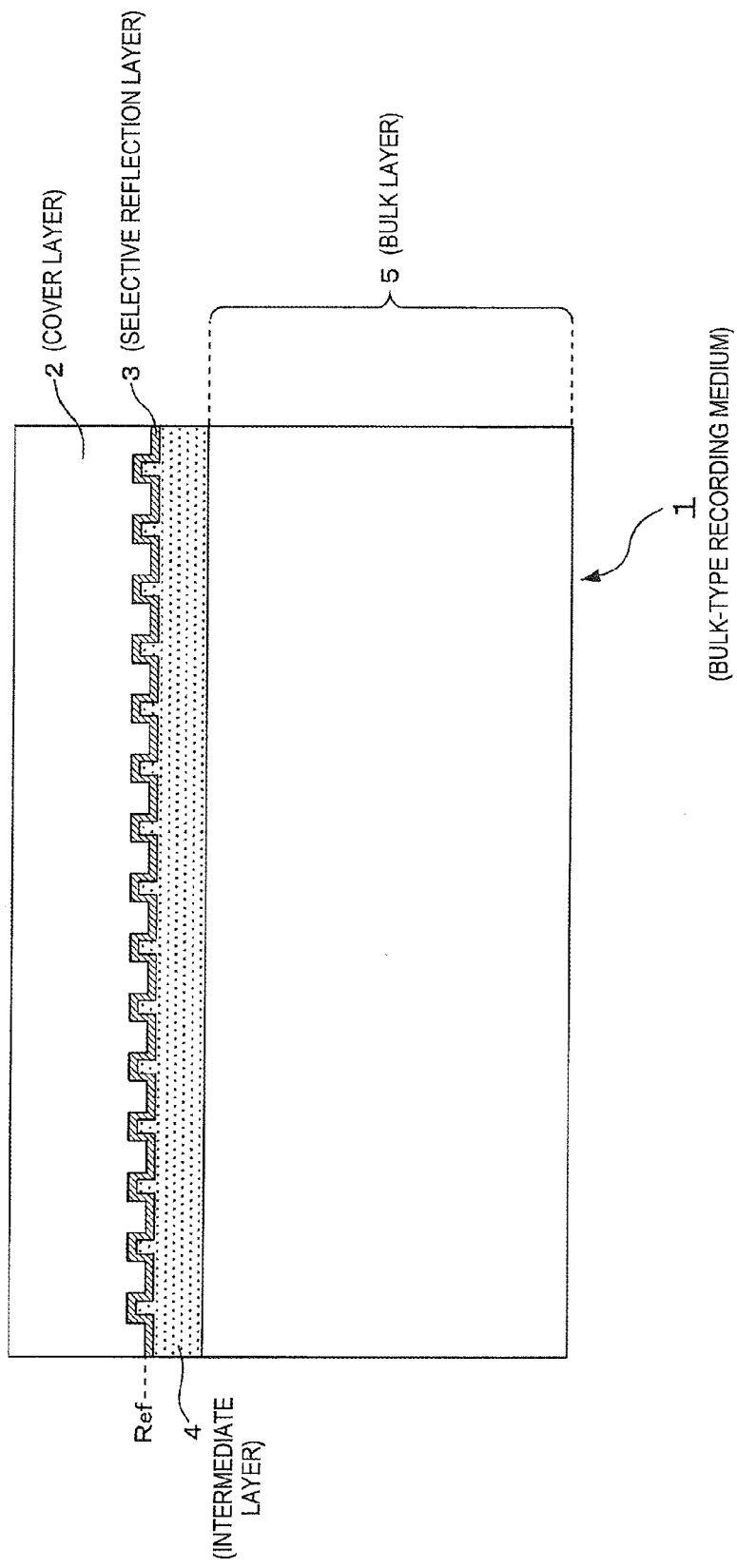
FIG. 1 is a diagram for explaining the structure of a disc recording medium of an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will be given in the following order.

<1. Structure of Optical Disc for which Recording is Performed>
<2. Configuration of Recording Apparatus of Embodiment>
<3. Process of Servo Scheme of Embodiment>
[3-1: Adjacent Track Servo (ATS)]
[3-2: Reference Surface Servo]
[3-3: ATS+Scheme]
<4. Servo Scheme of First Embodiment>
<5. Servo Scheme of Second Embodiment>
<6. Servo Scheme of Third Embodiment>
<7. Modification>

In addition, for the purpose of convenience, an adjacent track servo is also called ATS.

Furthermore, it is assumed that "ATS+" indicates a servo scheme in which both the ATS and a reference surface servo are used. First to third embodiments are examples in which technology of the present disclosure has been applied to the ATS+ scheme as a tracking servo scheme using the adjacent track servo.

(1. Structure of Optical Disc for which Recording is Performed)

FIG. 1 illustrates the sectional structure of an optical disc recording medium for which a recording apparatus of an embodiment performs recording.

The optical disc recording medium for which the recording is performed in the embodiment is a so-called bulk recording-type optical disc recording medium, and will be hereinafter referred to as a bulk-type recording medium 1.

In the state in which the bulk-type recording medium 1, which is the optical disc recording medium, is rotated and driven by the recording apparatus, a laser beam is irradiated, so that mark recording (information recording) is performed.

In addition, the optical disc recording medium is a general term for a disc-like recording medium in which recording (and reproduction) of information is performed through light irradiation.

As illustrated in FIG. 1, the bulk-type recording medium 1 includes a cover layer 2, a selective reflection film 3, an intermediate layer 4, and a bulk layer 5 which are sequentially formed from an upper layer-side.

Here, the "upper layer-side" in the present specification indicates an upper layer-side when an incident surface of a laser beam from a recording apparatus (a recording apparatus 10)-side as an embodiment, which will be described later, is set as an upper surface.

Furthermore, in the present specification, a term "depth direction" is used. However, the "depth direction" indicates a direction (that is, a direction parallel to an incident direction of a laser beam from the recording apparatus-side: a focus direction) coinciding with an up and down direction (a vertical direction) according to the definition of the "upper layer-side".

In the bulk-type recording medium 1, the cover layer 2, for example, is formed of a resin such as polycarbonate or acryl, and is provided at a lower surface-side thereof with a position director for guiding the recording position as illustrated in FIG. 1.

In this case, as the position director, a guide groove is formed by a continuous groove (a groove) or a pit string, and has a concave-convex section as illustrated in FIG. 1. In the present example, the guide groove, which is the position director, has a spiral shape.

The cover layer 2 is generated by injection molding using a stamper formed with the above guide groove (a concave-convex pattern).

Furthermore, the selective reflection film 3 is formed at the lower surface-side of the cover layer 2 formed with the guide groove.

In a bulk recording scheme, separately from a recording light for performing mark recording with respect to the bulk layer 5, which is a recording layer, a servo light for obtaining an error signal of tracking or focus based on the above guide groove may be separately irradiated. In addition, it is assumed that the servo light is called a "reference surface servo light" for distinction with an adjacent servo light (an ATS light) used in an adjacent track servo which will be described later.

At this time, if the reference surface servo light reaches the bulk layer 5, it may have an adverse influence on mark recording in the bulk layer 5. Therefore, it is necessary to provide a reflection film having selectivity for reflecting the reference surface servo light and allowing a recording light to pass therethrough.

In the bulk recording scheme according to the related art, the recording light and the reference surface servo light use laser beams having different wavelength bands from each other. In this regard, as the selective reflection film 3, a selective reflection film which has wavelength selectivity for reflecting light with the same wavelength band as that of the reference surface servo light and allowing light with other wavelength bands to pass therethrough is used.

The bulk layer 5 serving as a recording layer is formed at (adheres to) the lower layer-side of the selective reflection film 3 through the intermediate layer 4 formed of an adhesive material such as UV cured resin.

A mark recording scheme for an optical disc recording medium, which is a target of the embodiment, is not specifically limited. That is, it is sufficient if an arbitrary scheme is employed in the category of the bulk recording scheme.

For example, as a mark formation scheme for the bulk layer 5, various schemes, such as a scheme for forming a mark through a change or loss of an interference fringe, a scheme for forming a hole (void) mark, or a scheme for forming a mark through a change in a refractive index, have been considered. In the present embodiment, the mark formation scheme is not specifically limited.

Thus, as a material (a recording material) of the bulk layer 5, it is sufficient if an optimal material is appropriately employed according to a bulk recording scheme to be employed.

Here, in the bulk-type recording medium 1 having the above configuration, the selective reflection film 3 having a concave-convex sectional pattern along the formation of the above-mentioned guide groove serves as a reflective surface serving as a reference when position control of the recording light is performed based on the servo light. In this sense, a surface provided with the selective reflection film 3 will be hereinafter referred to as a reference surface Ref.

Figure 2:
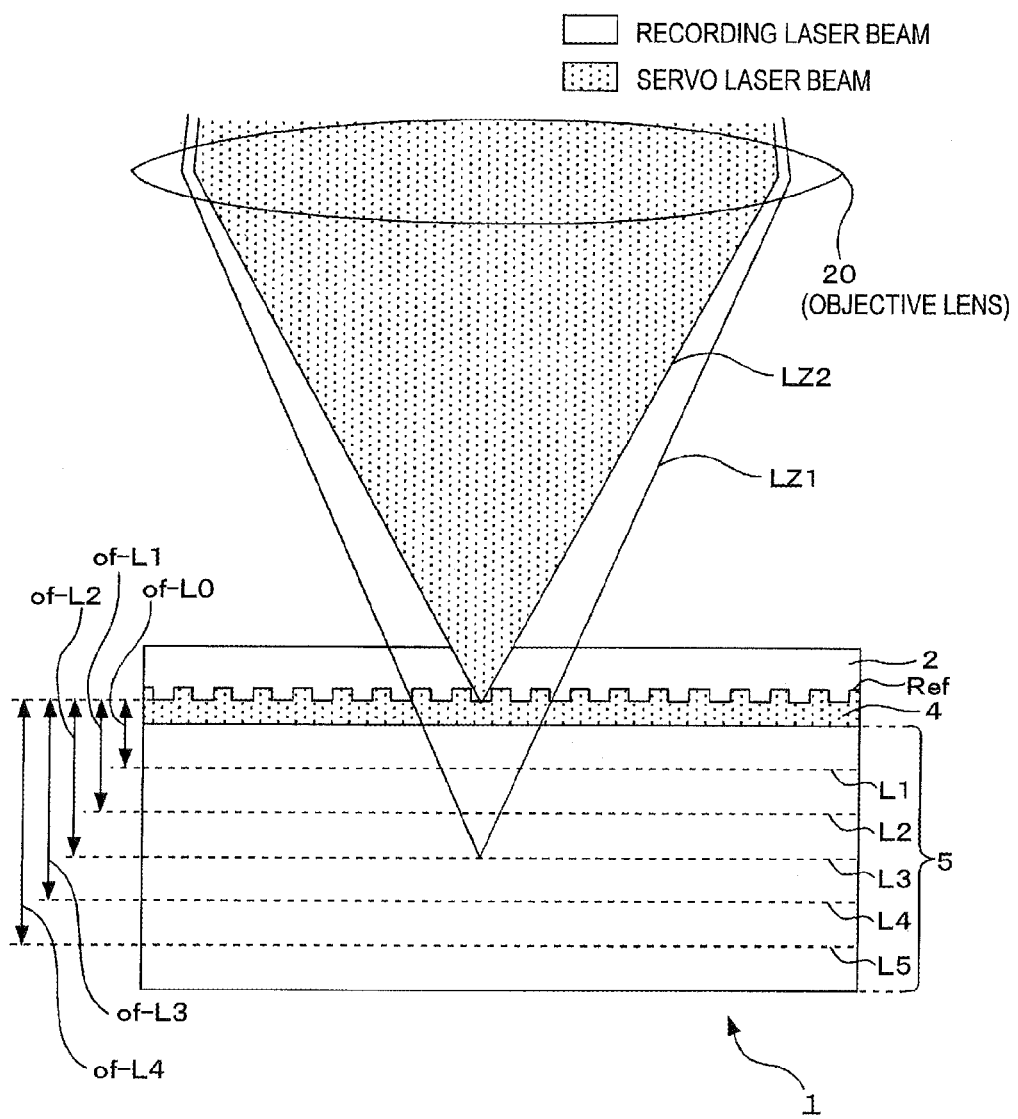
FIG. 2 is a diagram for explaining focus control for a disc recording medium of an embodiment.

With reference to FIG. 2, a description will be provided for focus servo control when recording is performed with respect to the bulk-type recording medium 1.

In order for the recording apparatus to perform multilayer recording in the bulk layer 5 with respect to the bulk-type recording medium 1, each layer position (each information recording layer position) at which information is to be recorded is set in advance.

As illustrated in FIG. 2, the information recording layer positions are separated from the reference surface Ref by offsets of-Lo, of-L1, of-L2 . . . offset of-L(n), and recording layers L0 to L(n) are formed at these positions, respectively.

In addition, FIG. 2 illustrates an example of a five-layer structure in which L(n) is L4. However, actually, a multilayer structure such as a 20-layer structure or a 30-layer structure has been discussed.

Information on the offsets of-L0 to of-L(n) from the reference surface Ref to the recording layers L0 to L(n) is set in the recording apparatus in advance. In addition, the offsets of-L0 to of-L(n) will be representatively referred to as an offset of-L.

As described above, a recording light LZ1 for forming a recording mark and a reference surface servo light LZ2 with a wavelength band different from that of the recording light LZ1 are irradiated onto the bulk-type recording medium 1. The recording light LZ1 and the reference surface servo light LZ2 are irradiated onto the bulk-type recording medium 1 through a common objective lens 20.

In addition, in the present embodiment, the adjacent servo light (the ATS light) for the adjacent track servo is also irradiated. However, for the simplification of drawing and description, the ATS light is omitted. The ATS light is a laser beam of reproduction power having the same wavelength band as that of the recording light LZ1, and it is sufficient if the ATS light is considered to be equal to the recording light LZ1 in FIG. 2.

As illustrated in FIG. 1, the bulk layer 5 in the bulk-type recording medium 1, for example, is not provided with a reflective surface having a guide groove through a pit, a groove and the like at each layer position at which recording is performed, differently from a multilayer disc for a current optical disc such as a DVD or a Blue-ray disc. Therefore, at the time of recording in which a mark is not formed, it is not possible to perform a focus servo or a tracking servo with respect to the recording light LZ1 using the reflected light of the recording light LZ1 itself.

Therefore, when recording is performed with respect to the bulk-type recording medium 1, the focus servo is performed with respect to the recording light LZ1 using the reflected light of the reference surface servo light LZ2.

In addition, the tracking servo is performed with respect to the recording light LZ1 through the ATS+ scheme using the reflected light of the reference surface servo light LZ2 and the reflected light of the ATS light, which will be described in detail later.

For the focus servo of the recording light LZ1 (and the ATS light) at the time of recording, the recording apparatus is provided with a focus mechanism (an expander including lenses 14 and 15 and a lens driving unit 16 in FIG. 3 which will be described later) capable of changing the focus position of the recording light LZ1 independently of the reference surface servo light. Furthermore, based on the offset of-L when the reference surface Ref has been employed as a reference as illustrated in FIG. 2, the focus servo is performed by controlling the focus mechanism (the expander) for the recording light.

Meanwhile, a focus servo of the reference surface servo light LZ2 is performed by controlling the objective lens 20 using a reflected light (a return light) from the reference surface 3 of the reference surface servo light LZ2.

The recording light LZ1 and the reference surface servo light LZ2 are irradiated through the common objective lens 20, and the focus servo of the reference surface servo light LZ2 is performed by controlling the objective lens 20 based on the reflected light from the reference surface Ref, so that the focus position of the recording light LZ1 basically traces the reference surface Ref.

In other words, through the focus servo of the objective lens 20 based on the reflected light from the reference surface Ref of the reference surface servo light LZ2, a tracing function for surface fluctuation of the bulk-type recording medium 1 is applied to the focus position of the recording light LZ1.

Then, the focus mechanism for the recording light LZ1 as described above allows the focus position of the recording light LZ1 to be offset by the value of the offset of-L. In this way, it is possible to allow the focus position of the recording light LZ1 to trace a desired depth position in the bulk layer 5.

For example, when recording is performed with respect to the recording layer L0, the focus mechanism for the recording light LZ1 allows the focus position of the recording light LZ1 to be offset by the value of the offset of-L1.

As described above, the focus mechanism for the recording light LZ1 is driven using the value of the offset of-L, so that it is possible to appropriately select a mark formation position (a recording layer position) in the depth direction from the recording layers L0 to L(n).

In addition, address information at the time of recording can be acquired using the fact that the concave-convex pattern (a pit string or a wobbling groove) having recorded the address information in the reference surface Ref has been formed. That is, it is possible to acquire the address information from reflected light information on the reference surface servo light LZ2 from the reference surface Ref.

Furthermore, in relation to the bulk-type recording medium 1, differently from FIG. 1, there may be a bulk-type recording medium in which the reference surface Ref is formed at a deep position as compared with the bulk layer 5 when viewed from the cover layer 2-side.

<2. Configuration of Recording Apparatus of Embodiment>

A description will be provided of the configuration of the recording apparatus of the embodiment, which performs information recording with respect to the bulk-type recording medium 1 as described above.

Figure 3:
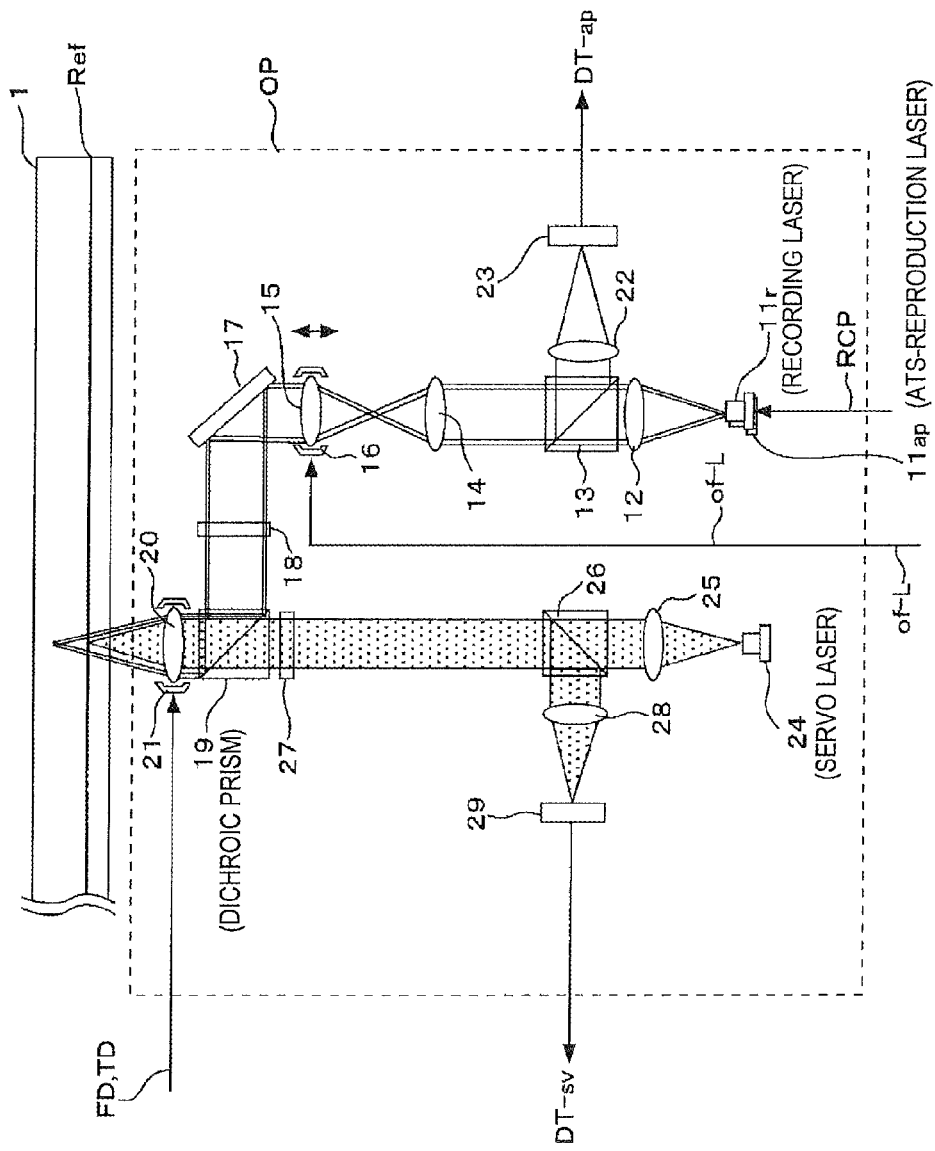
FIG. 3 is a diagram for explaining an optical system of a recording apparatus of an embodiment.

FIG. 3 illustrates the configuration of an optical system provided in the recording apparatus which performs recording with respect to the bulk-type recording medium 1 illustrated in FIG. 1. In detail, FIG. 3 illustrates an optical pick up OP provided in the recording apparatus while emphasizing the internal configuration of the optical pick up OP.

In FIG. 3, the bulk-type recording medium 1 provided in the recording apparatus is reset such that a center hole is clamped at a predetermined position in the recording apparatus, and is held to be rotated and driven by a spindle motor (not illustrated).

The optical pick up OP is provided to irradiate the recording light, the reference surface servo light, and the ATS light for forming a spot for the adjacent track servo onto the bulk-type recording medium 1 to be rotated and driven by the spindle motor.

In addition, in the present example, the ATS light is used as a reproduction light for reproducing a signal recorded by a mark at the time of reproduction.

The optical pick up OP is provided therein with a recording laser 11r serving as a light source of the recording light for performing signal recording by a mark, and a servo laser 24 serving as a light source of the reference surface servo light for performing position control using the position director formed on the reference surface Ref. Moreover, the optical pick up OP is provided therein with an ATS•reproduction laser 11ap serving as a light source for irradiating a laser beam for irradiating the ATS light at the time of recording and reading a recording signal at the time of reproduction.

Here, as described above, the recording light and the reference surface servo light have different wavelength bands from each other. In the present example, it is assumed that the recording light has a wavelength of about 405 nm (that is, a bluish-purple laser beam), and the reference surface servo light has a wavelength of about 650 nm (a red laser beam).

Furthermore, a laser beam (also called an "ATS light" in relation to recording and a "reproduction light" in relation to reproduction), which serves as an ATS light or a reproduction light for signal reading and uses the ATS•reproduction laser 11ap as a light source, has to reach the bulk layer 5 by passing through the selective reflection film 3, and has a wavelength equal to that of the recording light because a recording reproduction wavelength is to be equivalent.

In addition, FIG. 3 illustrates only one ATS•reproduction laser 11ap. However, in a first embodiment which will be described later, two ATS lights (a main ATS light and a sub-ATS light) are irradiated. Therefore, two ATS•reproduction lasers 11ap may be provided. Alternatively, the ATS•reproduction laser 11ap may be provided in the form of a multibeam laser diode. Moreover, alternatively, a plurality of ATS lights, which include a main ATS light and a sub-ATS light, may be formed through the grating of the ATS light from the ATS•reproduction laser 11ap.

In the optical pick up OP, the objective lens 20 serving as a common output terminal to the bulk-type recording medium 1 of the recording light, the reference surface servo light, and the ATS light is provided.

Moreover, in the optical pick up OP, a first light receiving unit 23 for receiving reflected light of the ATS light from the bulk-type recording medium 1, and a second light receiving unit 29 for receiving reflected light of the reference surface servo light from the bulk-type recording medium 1 are provided.

In addition, in the optical pick up OP, an optical system for introducing the recording light, which has been irradiated by the recording laser 11r, and the ATS light, which has been irradiated by the ATS•reproduction laser 11ap, to the objective lens 20, and for introducing the reflected light of the ATS light from the bulk-type recording medium 1, which has been incident on the objective lens 20, to the first light receiving unit 23 are provided.

In detail, the recording light, which has been irradiated by the recording laser 11r, and the ATS light, which has been irradiated from the ATS•reproduction laser flap, become a parallel light through a collimation lens 12, and then are incident on a polarization beam splitter 13. The polarization beam splitter 13 is configured to allow the recording light and the ATS light, which are incident from the light source-side as described above, to pass therethrough.

The recording light and the ATS light, which have passed through the polarization beam splitter 13, are incident on the expander including the fixed lens 14, the movable lens 15, and the lens driving unit 16. The expander has a configuration in which a side thereof near the light source is the fixed lens 14, and the movable lens 15 is arranged at a side thereof far from the light source and is driven by the lens driving unit 16 in the direction parallel to an optical axis of incident light, and performs focus control independent of the recording light, the ATS light, and the reference surface servo light. The expander corresponds to the focus mechanism for recording described in FIG. 2.

Figure 4:
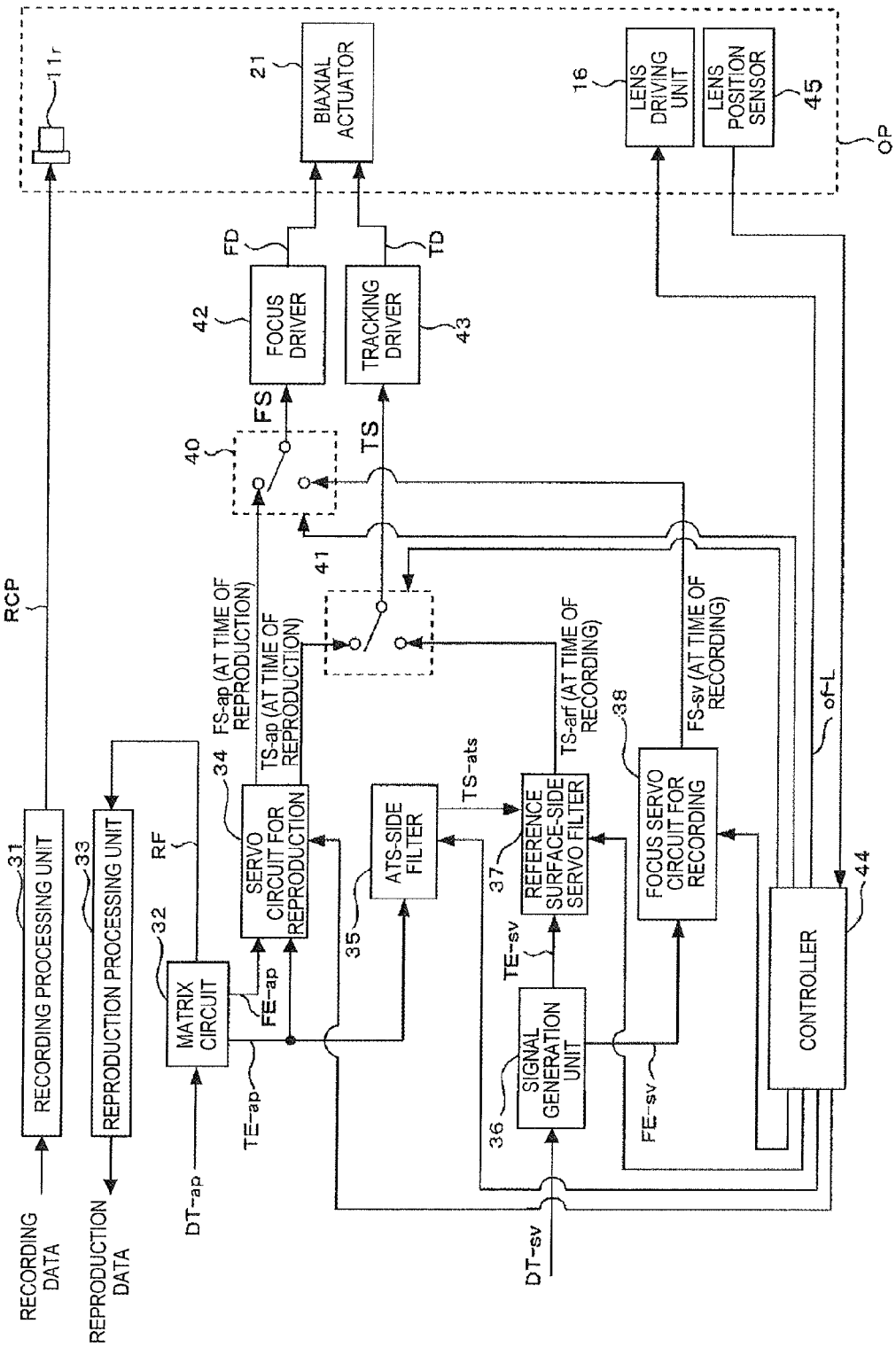
FIG. 4 is a block diagram of the internal configuration of a recording apparatus of an embodiment.

The lens driving unit 16 in the focus mechanism for recording is driven by a controller 44, which is illustrated in FIG. 4 and will be described later, according to the value of the offset of-L set corresponding to an information recording layer position at which recording is to be performed.

Each laser beam having passed through the fixed lens 14 and the movable lens 15, which constitute the focus mechanism for recording, is reflected by a mirror 17 as illustrated in FIG. 3, and then is incident on a dichroic prism 19 through a ¼ wavelength plate 18.2

The dichroic prism 19 has a selective reflection surface configured to reflect light with the same wavelength bands as the recording light and the ATS light and to allow light with other wavelength bands to pass therethrough. Thus, the incident recording light and ATS light as described above is reflected by the dichroic prism 19.

Each laser beam reflected by the dichroic prism 19 is irradiated onto the bulk-type recording medium 1 through the objective lens 20.

Figure 10A:
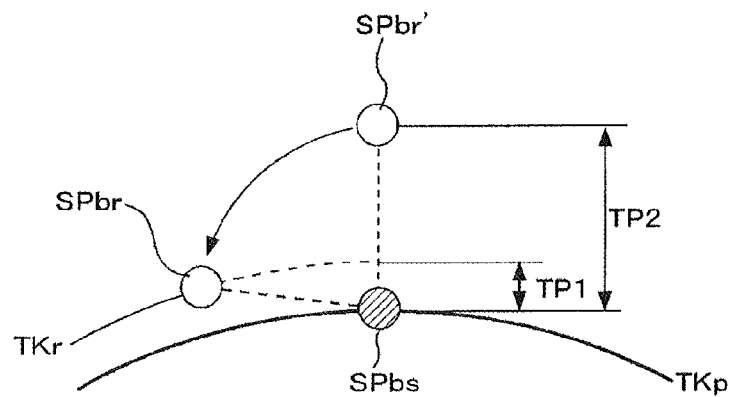
FIGS. 10A, 10B and 10C are diagrams for explaining the difference in positions in the circumferential direction of a recording light and an ATS light in an adjacent track servo, and the influence thereof.
Figure 12A:
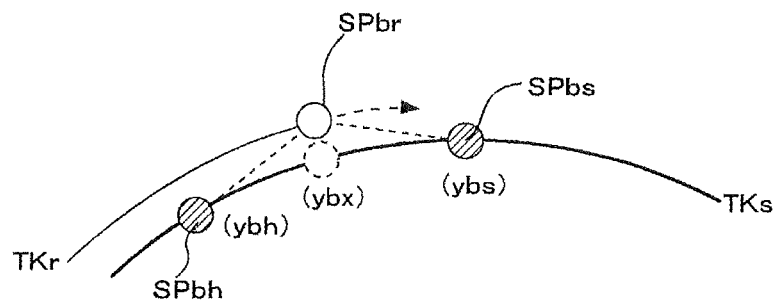
FIGS. 12A and 12B are diagrams for explaining a spot position of a first embodiment.

Here, the recording light and the ATS light are irradiated through the objective lens 20 as described above, so that a recording spot SPbr and an adjacent track servo spot (an ATS spot) SPbs are formed at target information recording layer positions in the bulk layer 5 as illustrated in FIG. 10A and FIG. 12A which will be described later (the ATS spots are two spots SPbs and SPbh as illustrated in FIG. 12A in relation to the first embodiment).

In this case, the optical system is provided such that the positional relation between the recording spot SPbr and the ATS spot SPbs (and SPbh) is fixed to a preset positional relation.

That is, the ATS light for forming the ATS spot SPbs (and SPbh) has an irradiation position different from a position (an angular position when viewed from a disc center) in the disc circumferential direction of the recording light for forming the recording spot SPbr, and is separated from the recording light by a predetermined distance in the disc radial direction.

The objective lens 20 is provided with a biaxial actuator 21 for holding the objective lens 20 to be displaced in a focus direction (a direction close to or away from the bulk-type recording medium 1) and a tracking direction (a direction perpendicular to the focus direction: a direction parallel to the radial direction of the bulk-type recording medium 1).

The biaxial actuator 21 is provided with a focus coil and a tracking coil, and displaces the objective lens 20 in the focus direction and the tracking direction using driving signals (driving signals FD and TD which will be described later) applied to the focus coil and the tracking coil.

Here, at the time of the recording and at the time of the reproduction, the ATS light (the reproduction light) is irradiated onto the bulk-type recording medium 1 as described above, so that a reflected light of the ATS light (the reproduction light) is obtained from mark strings in the bulk layer 5.

The reflected light of the ATS light is introduced into the dichroic prism 19 through the objective lens 20 and is reflected by the dichroic prism 19.

The reflected light of the ATS light reflected by the dichroic prism 19 is incident on the polarization beam splitter 13 after sequentially passing through the ¼ wavelength plate 18, the mirror 17, and the focus mechanism for recording (the movable lens 15 and the fixed lens 14).

The reflected light (a return light) of the ATS light incident on the polarization beam splitter 13 has a polarization direction that is 90° different from that of a light (an outward light) incident on the polarization beam splitter 13 from the ATS•reproduction laser 11ap-side, by the operation of the wavelength plate 18 and the operation of the bulk-type recording medium 1 at the time of reflection. As a consequence, the reflected light of the ATS light is reflected by the polarization beam splitter 13.

Then, the reflected light of the ATS light reflected by the polarization beam splitter 13 is collected on a light receiving surface of the first light receiving unit 23 through a condenser lens 22.

Here, a description based on the drawing will be omitted. However, the first light receiving unit 23 includes a plurality of light receiving elements (four in this case). Hereinafter, light receiving signals obtained by the plurality of light receiving elements as the first light receiving unit 23 are representatively indicated as a light receiving signal DT-ap.

In addition, in relation to the first embodiment, since two reflected lights are obtained at the two ATS spots SPbs and SPbh, the first light receiving unit 23 includes two light receiving elements for receiving the two reflected lights of the ATS light.

Furthermore, in the optical pick up OP, an optical system for introducing the reference surface servo light, which has been irradiated by the servo laser 24, into the objective lens 20 and for introducing a reflected light of the reference surface servo light from the bulk-type recording medium 1 into the second light receiving unit 29 is provided, in addition to the configuration of the operation system for the ATS light.

The reference surface servo light irradiated by the servo laser 24 becomes a parallel light through the collimation lens 25 and then is incident on a polarization beam splitter 26. The polarization beam splitter 26 is configured to allow the reference surface servo light (the outward light) incident from the servo laser 24-side to pass therethrough.

The reference surface servo light having passed through the polarization beam splitter 26 is incident on the dichroic prism 19 through a ¼ wavelength plate 27.

As described above, since the dichroic prism 19 is configured to reflect light with the same wavelength bands as the recording light and the ATS light and to allow lights with other wavelength bands to pass therethrough, the reference surface servo light passes through the dichroic prism 19 and is incident on the bulk-type recording medium 1 through the objective lens 20.

Furthermore, the reflected light (the reflected light from the reference surface Ref) of the reference surface servo light, which is obtained through the irradiation of the reference surface servo light to the bulk-type recording medium 1, passes through the dichroic prism 19 through the objective lens 20, and is incident on the polarization beam splitter 26 through the ¼ wavelength plate 27.

The reflected light (the returning light) of the reference surface servo light, which has been incident from the bulk-type recording medium 1-side, has a polarization direction that is 90° different from that of an outward light by the operation of the ¼ wavelength plate 27 and the operation of the bulk-type recording medium 1 at the time of reflection, and thus the reflected light (the returning light) of the reference surface servo light is reflected by the polarization beam splitter 26.

Then, the reflected light of the reference surface servo light reflected by the polarization beam splitter 26 is collected on a light receiving surface of the second light receiving unit 29 through a condenser lens 28.

The second light receiving unit 29 also includes a plurality of light receiving elements (for example, four). Hereinafter, light receiving signals obtained by the plurality of light receiving elements of the second light receiving unit 29 are representatively indicated as a light receiving signal DT-sv.

Here, a description based on the drawing will be omitted. However, the recording apparatus is provided with a slide driving unit for slidably driving the entire optical pick up OP in the tracking direction, and the optical pick up OP is driven by the slide driving unit, so that it is possible to displace an irradiation position of a laser beam in a wide range.

FIG. 4 illustrates the overall internal configuration of the recording apparatus of the embodiment.

In addition, FIG. 4 illustrates the internal configuration of the optical pick up OP by extracting only the recording laser 11r, the lens driving unit 16, and the biaxial actuator 21 from the configuration illustrated in FIG. 3.

In addition, in the case of second and third embodiments which will be described later, since a lens position sensor for detecting the position of the objective lens 20 may be provided, the lens position sensor is illustrated as a lens position sensor 45.

In FIG. 4, the recording apparatus is provided with a recording processing unit 31, a matrix circuit 32, a reproduction processing unit 33, a servo circuit 34 for reproduction, and an ATS-side filter 35 of FIG. 4 as a signal processing system related to the recording light and the ATS light.

The recording processing unit 31 receives data (recording data) to be recorded on the bulk-type recording medium 1.

The recording processing unit 31 performs addition of an error correction code, predetermined recording modulation coding, addition of address information and the like with respect to the input recording data, thereby obtaining a recording modulation data string, for example, a binary data string of "0"s and "1"s, which is actually recorded on the bulk-type recording medium 1.

Then, the recording laser 11r in the optical pick up OP emits light by a recording pulse signal RCP generated based on the recording modulation data strings.

The matrix circuit 32 receives the light receiving signal DT-op from the above-mentioned first light receiving unit 23.

The matrix circuit 32 generates various signals necessary for a matrix operation process based on the light receiving signal DT-ap.

As described above, in the present example, when the signal recorded in the bulk layer 5 by the mark string is reproduced (user data is reproduced), the ATS light is used as a laser beam (a reproduced light) for reproduction. In addition, at the time of reproduction, focus servo control and tracking servo control are also performed with respect to a previous recording mark string based on the reflected light of the ATS light.

In this regard, based on the light receiving signal DT-op, the matrix circuit 32 is configured to generate a high frequency signal (a sum signal: hereinafter referred to as a reproduction signal RF) corresponding to a reproduction signal of the above-mentioned recording modulation data string, a focus error signal FE-ap (a signal indicating a focus error for the mark string) for the focus servo control, and a tracking error signal TE-ap (a signal indicating a positional error in the radial direction for the previous recording mark string of the spot SPbs for the adjacent track servo) for the tracking servo control.

The reproduction signal RF generated by the matrix circuit 32 is supplied to the reproduction processing unit 33.

Furthermore, the focus error signal FE-ap is supplied to the servo circuit 34 for reproduction.

Furthermore, the tracking error signal TE-ap is supplied to the servo circuit 34 for reproduction, and is also supplied to the ATS-side filter 35 in order to be used for position control at the time of recording which will be described later.

The reproduction processing unit 33 performs a reproduction process for restoring the above-mentioned recording data, such as a binarization process or decoding•error correction process of a recording modulation code, with respect to the reproduction signal RF, thereby obtaining reproduction data from the recording data.

Furthermore, the reproduction processing unit 33 also detects address information included in data recorded by the mark string. Although not illustrated in FIG. 4, the detected address information is supplied to the controller 44.

The servo circuit 34 for reproduction generates a focus servo signal FS-ap and a tracking servo signal TS-ap based on the focus error signal FE-ap and the tracking error signal TE-ap according to the instructions of the controller 44.

Here, the focus servo signal FS-ap is used to allow the focus position of the ATS light to trace (to cancel a focus error) an information recording layer position (a mark formation layer position) at which reproduction is performed.

Furthermore, the tracking servo signal TS-ap is used to allow the spot position of the ATS light to trace (to cancel a tracking error) the mark string.

The focus servo signal FS-ap and the tracking servo signal TS-ap are used at the time of the reproduction.

As illustrated in FIG. 4, the focus servo signal FS-ap is supplied to a selector 40 and the tracking servo signal TS-ap is supplied to a selector 41.

The ATS-side filter 35 generates a tracking servo signal TS-ats based on the tracking error signal TE-ap according to the instructions of the controller 44.

In detail, the ATS-side filter 35 performs a filtering process for the tracking servo of phase compensation and the like with respect to the tracking error signal TE-ap, thereby generating the tracking servo signal TS-ats for cancelling the tracking error indicated by the tracking error signal TE-ap.

At this time, the ATS-side filter 35, for example, includes a full integration or linear low pass filter (LPF) and the like, which does not generate a peak in an ATS loop.

As illustrated in FIG. 4, the tracking servo signal TS-ats is supplied to a reference surface-side servo filter 37.

The recording apparatus is provided with a signal generation unit 36, the reference surface-side servo filter 37, and a focus servo circuit 38 for recording as a signal processing system for the reflected light of the reference surface servo light.

The signal generation unit 36 generates desired signals based on the light receiving signal DT-sv from the plurality of light receiving elements in the second light receiving unit 29 illustrated in FIG. 3.

In detail, based on the light receiving signal DT-sv, the signal generation unit 36 generates a tracking error signal TE-sv, which indicates a positional error in the radial direction of an irradiation spot position of the reference surface servo light relative to the position director (a track) formed in the reference surface Ref.

Furthermore, the signal generation unit 36 generates a focus error signal FE-sv, which indicates a focus error of the reference surface servo light relative to the reference surface Ref (the selective reflection film 3), as a signal for performing the focus servo control at the time of the recording.

The focus error signal FE-sv generated by the signal generation unit 36 is supplied to the focus servo circuit 38 for recording.

The focus servo circuit 38 for recording generates a focus servo signal FS-sv based on the focus error signal FE-sv, and outputs the focus servo signal FS-sv to the selector 40, according to the instructions of the controller 44.

The selector 40 selects the focus servo signal FS-sv (that is, a servo control signal for allowing the focus position of the reference surface servo light to trace the reference surface Ref) from the focus servo circuit 38 for recording at the time of the recording, and selects the focus servo signal FS-ap (a servo control signal for allowing the focus position of the reproduction light to trace the information recording layer position at which reproduction is performed) from the ATS-side filter 35 at the time of the reproduction, according to the instructions of the controller 44.

The focus servo signal FS selected by the selector 40 is supplied to a focus driver 42.

The focus driver 42 drives a focus coil of the biaxial actuator 21 by a focus driving signal FD generated based on the received focus servo signal FS.

In this way, at the time of the recording, the objective lens 20 is driven such that the focus position of the reference surface servo light traces the reference surface Ref. Furthermore, at the time of the reproduction, the objective lens 20 is driven such that the focus position of the ATS light (that is, the reproduction light) traces the information recording layer position at which reproduction is performed.

In addition, as will be described later, the focus control (focus control for focusing on the information recording layer position at which recording is performed) for the ATS light (and the recording light) at the time of the recording is performed under the control of the lens driving unit 16 (the expander).

Furthermore, the tracking error signal TE-sv generated by the signal generation unit 36 is supplied to the reference surface-side servo filter 37.

Here, the tracking servo signal TS-ats is also supplied to the reference surface-side servo filter 37 from the ATS-side filter 35 as described above.

In the first to third embodiments, the ATS+ scheme is employed as a tracking servo scheme at the time of the recording. The tracking servo scheme of the first to third embodiments will be described in detail later. However, the ATS+ scheme is a servo scheme using both the ATS and the reference surface servo.

The reference surface-side servo filter 37 inputs the tracking servo signal TS-ats of the ATS-side to a reference surface servo loop, thereby generating a tracking servo signal TS-arf at the time of the recording.

The tracking servo signal TS-arf generated by the reference surface-side servo filter 37 is supplied to the selector 41.

The selector 41 selects the tracking servo signal TS-arf at the time of the recording, and selects the tracking servo signal TS-ap from the servo circuit 34 for reproduction at the time of the reproduction, according to the instructions of the controller 44.

The tracking servo signal TS selected by the selector 41 is supplied to a tracking driver 43.

The tracking driver 43 drives the tracking coil of the biaxial actuator 21 by a tracking driving signal TD generated based on the received tracking servo signal TS.

In this way, at the time of the reproduction, the objective lens 20 is driven based on the tracking servo signal TS-ap such that the spot position of the ATS light traces the mark string. Furthermore, at the time of the recording, the objective lens 20 is driven based on a servo control signal of the ATS+ scheme in which both a tracking error component of the ATS light and a tracking error component of the reference surface servo light have been reflected, wherein the servo control signal serves as the tracking servo signal TS-arf.

The controller 44, for example, includes a microcomputer having a central processing unit (CPU) or a memory (a storage device) such as a read only memory (ROM) or a random access memory (RAM), and for example, controls the whole of the recording device by performing control·processing according to programs stored in the ROM and the like.

For example, the controller 44 controls (sets) the focus positions of the recording light and the ATS light at the time of the recording based on the value of the offset of-L set in advance corresponding to each information recording layer position as described above. In detail, the controller 44 drives the lens driving unit 16 in the optical pick up OP based on the value of the offset of-L set corresponding to the information recording layer position at which the recording is to be performed, thereby selecting a recording position in the depth direction and the focus position of the ATS light.

Furthermore, at the time of the recording and the reproduction, the controller 44 controls a focus servo and a tracking servo to be performed using techniques corresponding to the recording and the reproduction.

In detail, for the focus servo-side, at the time of the recording, the controller 44 controls the focus servo circuit 38 for recording to generate the focus servo signal FS-sv and the selector 40 to select the focus servo signal FS-sv such that the focus servo control of the objective lens 20 is performed based on the reflected light of the reference surface servo light.

Furthermore, at the time of the reproduction, in order to perform the focus servo control of the objective lens 20 based on the reflected light from the mark string of the ATS light, the controller 44 controls the servo circuit 34 for reproduction to generate the focus servo signal FS-ap and the selector 40 to select the focus servo signal FS-ap.

Furthermore, for the tracking servo, at the time of the recording, the controller 44 controls the processes of the reference surface-side servo filter 37 and the ATS-side filter 35 to be performed and the selector 41 to select the tracking servo signal TS-arf such that the tracking servo control of the objective lens 20 is performed based on the reflected light of the reference surface servo light and the reflected light of the ATS light.

Furthermore, at the time of the reproduction, in order to perform the tracking servo control of the objective lens 20 based on the reflected light of the ATS light, the controller 44 controls the servo circuit 34 for reproduction to generate the tracking servo signal TS-ap and the selector 41 to select the tracking servo signal TS-ap.

In addition, in the second and third embodiments, the lens position sensor 45 may be provided. The lens position sensor 45 detects position information of the objective lens 20 and supplies the detected position information to the controller 44. The controller 44 provides the reference surface-side servo filter 37 with information on a reference value (an offset amount) OFS corresponding to the eccentricity, which is used in the operation of the ATS+ scheme, based on the information of the lens position sensor 45.

Alternatively, the signal generation unit 36 may generate the reference value OFS corresponding to the eccentricity from information on the reference surface Ref. In this case, the lens position sensor 45 is not necessary.

<3. Process of Servo Scheme of Embodiment>

[3-1: Adjacent Track Servo (ATS)]

Here, for the understanding of an embodiment which will be described later, a description will be provided for a technical process for leading the development of the tracking servo scheme at the time of the recording in the embodiment. In detail, the ATS scheme, the reference surface servo scheme, and the ATS+ scheme will be described.

First, the ATS scheme will be described.

As one technique for increasing the capacity of the optical disc recording medium, there is a method of increasing the number of information recording layers in the thickness direction of a disc.

In an optical disc in the related art, ditches called grooves have been formed in the information recording layer, the spot positions of the recording light and the reproduction light are detected using the grooves, and the spots of the recording light and the reproduction light are controlled to reach predetermined positions.

However, forming the grooves is a burdensome procedure, and when forming the grooves on the entire surface of each recording layer, if the number of recording layers is increased, the manufacturing cost of the disc may increase.

In this regard, the ATS scheme has been proposed.

According to the ATS scheme, the grooves are not formed on the entire surface and are formed only on a part of the recording layer. Then, a servo light (an ATS light) is controlled to trace the formed grooves, and a signal is recorded at a place with no grooves by a recording light separated from the ATS light by a predetermined distance. Then, the ATS light is controlled to trace the signal recorded by the recording light, resulting in a reduction of the cost related to the formation of the grooves.

Figure 5A:
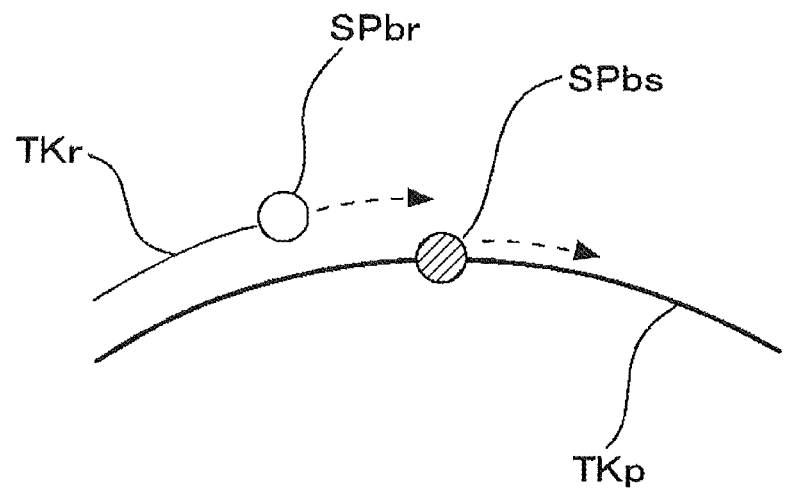
FIGS. 5A and 5B are diagrams for explaining an adjacent track servo.
Figure 5B:
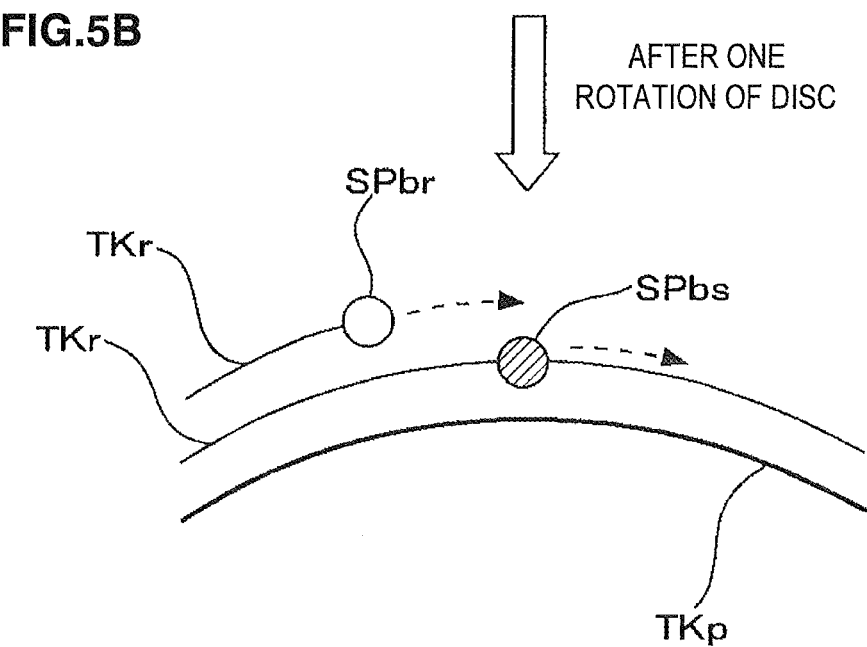

FIGS. 5A and 5B illustrate a schematic operation. A track TKp formed in advance illustrated in FIG. 5A, for example, is formed as a groove.

The recording light and the ATS light are irradiated onto the recording layer of the optical disc. The spot (the recording spot SPbr) of the recording light and the spot (the ATS spot SPbs) of the ATS light are fixedly separated from each other by a track pitch in the radial direction.

First, the ATS spot SPbs is controlled to trace the formed track TKp in an on-tracking state. In this way, data is recorded by the recording spot SPbr separated by the track pitch, and a track TKr is formed as illustrated in FIG. 5A.

Then, as illustrated in FIG. 5B, the ATS spot SPbs traces a track previously recorded by the recording spot SPbr, so that data is newly recorded by the recording spot SPbr at the outer peripheral side of the optical disc, and the track TKr is formed.

According to the ATS as described above, since the track pitch can be constant as a distance in the radial direction between the spots SPbs and SPbr, even when the groove is not formed on the entire surface, it is possible to form a spiral-shaped track having a predetermined track pitch.

However, in the case of the ATS, since noise in a specific frequency band may be emphasized by servo characteristics, a servo may diverge.

Figure 6A:
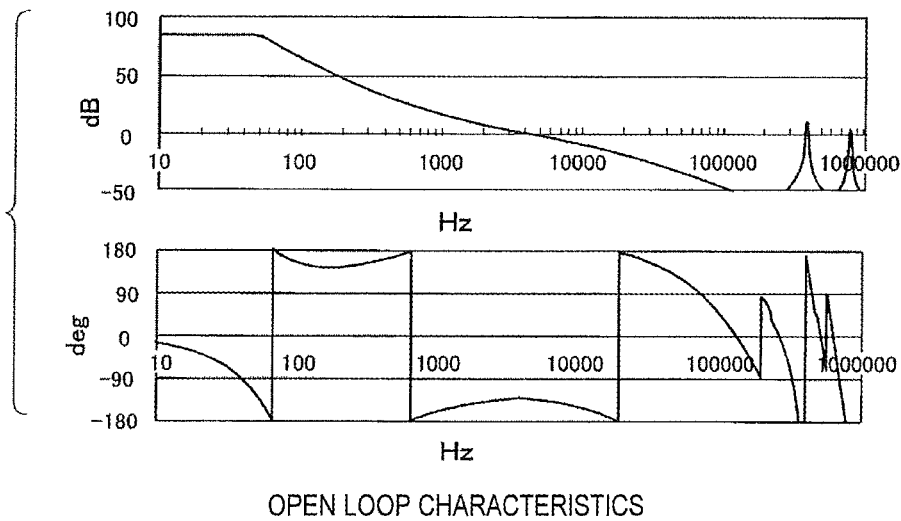
FIGS. 6A and 6B are diagrams for explaining an example of tracking servo characteristics.
Figure 6B:
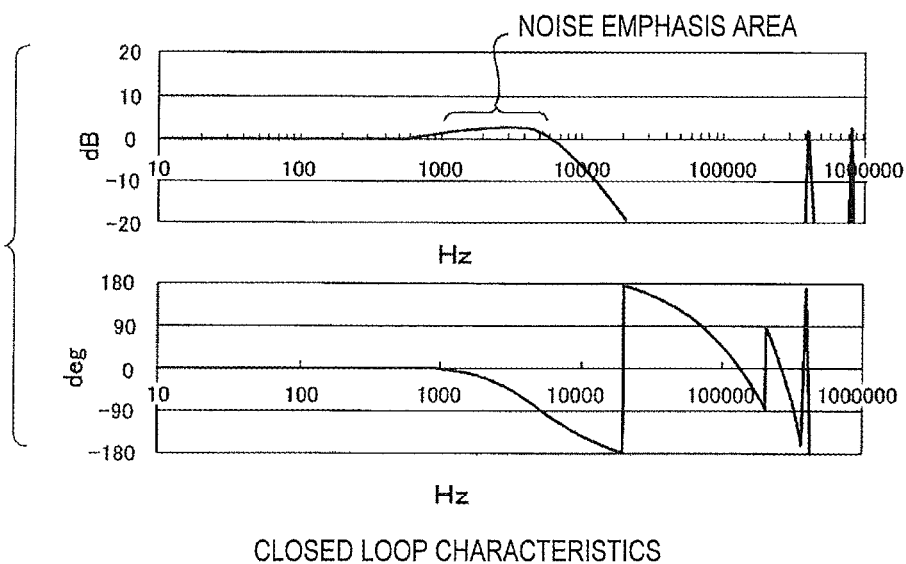

FIGS. 6A and 6B illustrate an example of general servo characteristics in the tracking servo of the optical disc. FIG. 6A illustrates open loop characteristics and FIG. 6B illustrates closed loop characteristics.

In this example, there is a tendency for a gain to be larger than 0 in the range of 1 kHz to 5 kHz.

In this case, a tracking servo operation excessively responds to disturbance of a frequency and the shape thereof is shown in the form of a track (a mark string). If a track rotates once and the ATS light reaches a place having responded the disturbance, since a mark string at that place includes a component of the frequency, the tracking servo operation responds more excessively to the frequency component. Therefore, since the frequency component included in the recorded mark string is gradually increased and exceeds the tracing performance of the tracking servo, tracking control may not be performed.

FIG. 7 illustrates a normal servo (a servo tracing a target track or groove) and the remainder amount of a tracking error component in the case of the ATS (the adjacent track servo).

As apparent from FIG. 7, in the case of the ATS, the remainder amount gradually diverges.

[3-2: Reference Surface Servo]

Meanwhile, there has been proposed a method in which the groove is not formed in the recording layer, a reference surface is provided separately from the recording layer, and a control signal (a groove and the like) is formed only on the reference surface. This corresponds to the structure as illustrated in FIG. 1 in the present example.

The servo light (the reference surface servo light) is controlled by the control signal formed on the reference surface and a signal is recorded on the recording layer by the recording light, resulting in a reduction in the cost of forming the groove in each recording layer.

However, in the case of the reference surface servo, since a reference surface and a recording surface from the objective lens are different from each other, when the objective lens having moved in order to trace the position shift of a track due to the eccentricity of the disc or when tilt and the like of the disc have occurred, shift occurs in a spot position on the reference surface and a spot position of the recording layer.

Figure 8A:
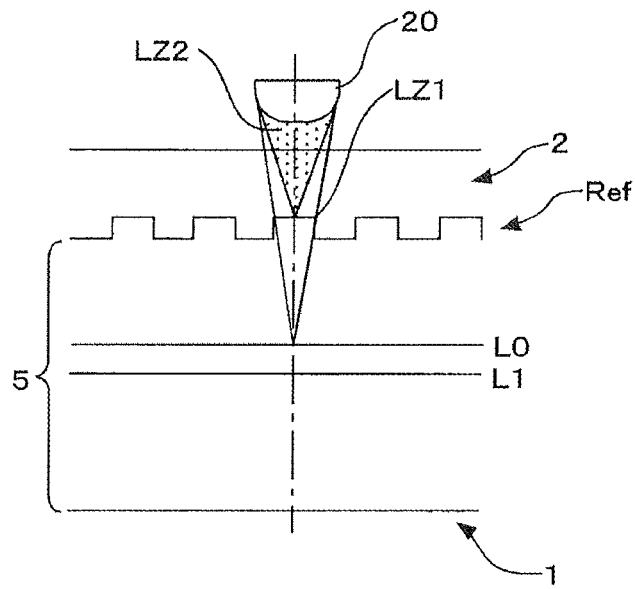
FIGS. 8A and 8B are diagrams for explaining spot position shift at a servo based on a reference surface servo.
Figure 8B:
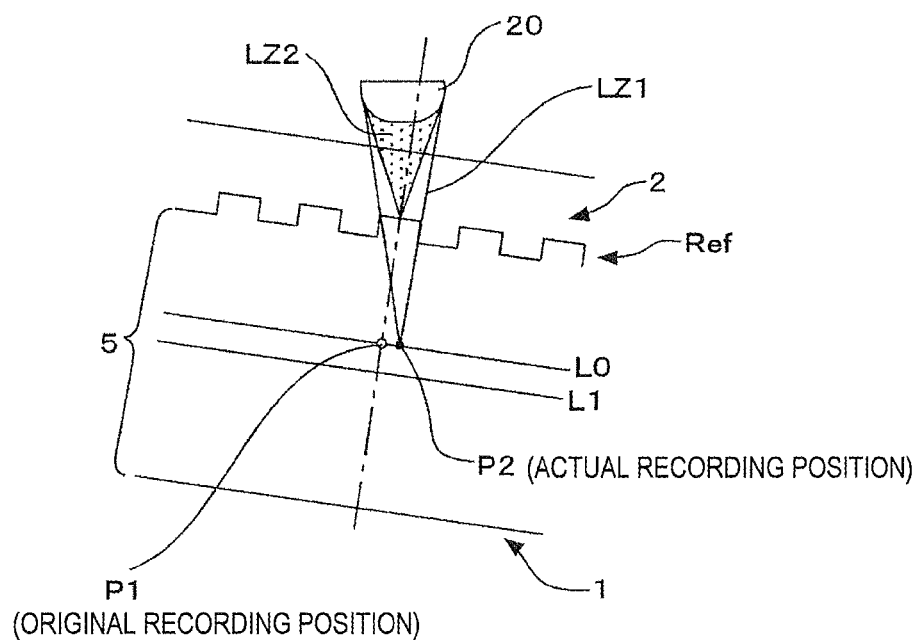

FIGS. 8A and 8B illustrate the shape of spot position shift. In FIGS. 8A and 8B, the reference numerals used in FIG. 1 and FIG. 2 are used. FIG. 8A illustrates a state in which no disc tilt or objective lens shift has occurred. In this case, FIG. 8A illustrates a state in which the reference surface servo light LZ2 is irradiated onto the reference surface Ref and the recording light LZ1 is irradiated onto the recording layer L0. In the reference surface Ref and the recording layer L0, a distance exists in the disc thickness direction. However, the spot positions of the reference surface servo light LZ2 and the recording light LZ1 coincide with each other on a vertical line (a dashed dotted line) of the disc. In this state, it is possible to form a mark string (a track) in the recording layer L0 in an exact tracking state by the recording light LZ1 through a tracking servo using the reference surface Ref.

However, for example, FIG. 8B illustrates a state in which the disc tilt has occurred. In this case, as illustrated in FIG. 8B, the spot positions of the reference surface servo light LZ2 and the recording light LZ1 do not coincide with each other on a vertical line (a dashed dotted line) of the disc. That is, since the recording light LZ1 has been originally irradiated to a position P1 of FIG. 8B, the spot positions are a position P2.

The shift of the spot position is increased as the distance between the reference surface Ref and the recording layer is increased. That is, the shift is increased the farther the recording layers (the recording layers L1, L2 . . . ) are from the reference surface Ref.

In order to permit the shift, a track interval would have to be reduced, but this is not possible. As a consequence, there is a problem that it is not possible to effectively increase the recording capacity of the disc.

[3-3: ATS+Scheme]

In this regard, the ATS+ scheme of using both the adjacent track servo (ATS) and the reference surface servo has been developed.

That is, spot shift of the reference surface servo light and the recording light used in the reference surface servo is corrected using the adjacent track servo, and a predetermined filtering process is performed for the adjacent track servo to prevent divergence due to servo characteristics, so that deterioration of the servo characteristics is compensated using the reference surface servo.

The recording apparatus of the present embodiment described in FIG. 3 and FIG. 4 has a configuration in which the tracking servo at the time of the recording is basically performed using the ATS+ scheme.

The recording apparatus of the embodiment includes the signal generation unit 36, the reference surface-side servo filter 37, and the tracking driver 43 as illustrated in FIG. 4, thereby forming a servo control system (a reference surface control system) for performing tracking servo control of the objective lens 20 based on the position director formed on the reference surface Ref.

That is, a tracking servo loop for performing the tracking servo control based on the position director of the reference surface Ref is formed.

Then, as a tracking servo control system at the time of the recording, both the reference surface control system and the servo control system based on the ATS are formed.

In detail, the matrix circuit 32 for generating the tracking error signal TE-ap indicating a tracking error for the mark string of the ATS light based on the reflected light of the ATS light, and the ATS-side filter 35 for generating the tracking servo signal TS-ats using the tracking error signal TE-ap are provided, so that the tracking servo signal TS-ats generated by the ATS-side filter 35 is supplied to the reference surface-side servo filter 37 and is provided to the tracking servo loop of the reference surface servo system.

This represents that the tracking servo signal TS-ats is configured to be provided as a target control value of the reference surface servo system. Alternatively, it can be said that the tracking servo loop, which is the reference surface servo system, is employed as a minor loop, and the tracking servo signal TS-ats is input as the target control value of the minor loop.

With such a configuration, the tracking error of the ATS control system mainly occurs due to the spot position shift (in this case, a spot position shift between the reference surface servo light and the ATS light) occurring due to the lens shift and the like of the objective lens 20 as described in FIGS. 8A and 8B.

Then, tracking error information of the ATS-side is provided as the target control value of the reference surface servo system, so that the object is driven to allow the spot position of the ATS light to trace the mark string.

In this case, the reference surface servo system including the reference surface-side servo filter 37 mainly has a function of tracing a normal disturbance component (that is, a frequency disturbance component higher than a disc eccentricity component and the like causing the spot position shift due to the lens shift and the like as described above).

In this sense, a control band of the reference surface control system is set to a control band when a normal servo control system is used. In detail, in the present example, the control band of the reference surface control system is set to about 10 kHz.

Meanwhile, for the ATS control system including the ATS-side filter 35, since tracing to a normal disturbance component is not performed, a control band of the ATS control system is set to a frequency band lower than at least the control band of the reference surface control system. For example, the control band (a cutoff frequency of the ATS-side filter 35) of the ATS control system is set to about 1 kHz.

According to the tracking servo control system of the embodiment in which the tracking servo signal TS-ats serving as the control signal of the ATS control system is provided to the tracking servo loop (the minus loop) serving as the reference surface servo system, it is possible to prevent the occurrence of the peak of a transfer characteristic gain as illustrated in FIG. 6, which has occurred in an existing single ATS control system.

The peak of the transfer characteristic gain is prevented from occurring, so that it is possible to prevent a problem that the tracking error signal is increased with the passage of time and diverges. As a consequence, the tracking servo control capable of preventing the occurrence of overlap or intersection of recording mark strings can be stably performed, as compared with the existing single ATS.

Figure 9:
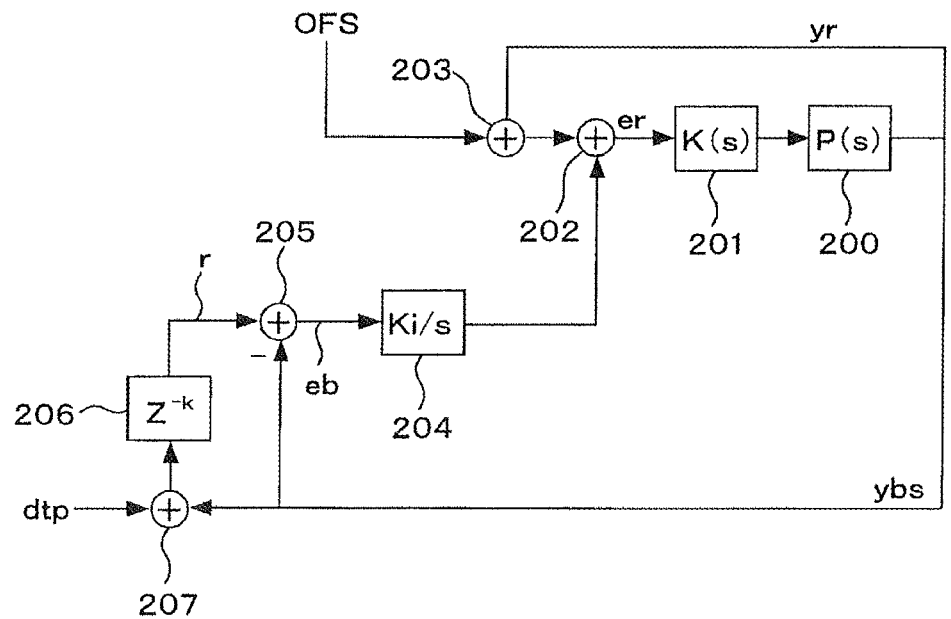
FIG. 9 is a block diagram of a control system of an ATS+ servo.

FIG. 9 illustrates the servo control system of the ATS+ scheme using transfer function blocks.

For the purpose of convenience, the transfer function blocks of FIG. 9 include a lens block 200, a reference surface servo block 201, an operation block 202, an operation block 203, an ATS control block 204, an operation block 205, a delay block 206, and an operation block 207.

The reference surface servo block 201 indicated by K(s) represents a discrete system transfer function of a servo operator (corresponds to the reference surface-side servo filter 37) as a controller in the reference surface servo system.

The ATS control block 204 indicated by Ki(s) represents a discrete system transfer function of a servo operator (corresponds to the ATS-side filter 35) as a controller in the ATS control system.

Furthermore, the lens block 200 indicated by P(s) represents a discrete system transfer function of an actuator for driving the objective lens 20.

$Z^{-k}$ of the delay block 206 represents that a signal is delayed for a time corresponding to one rotation of the disc.

Furthermore, FIG. 9 illustrates a target control position r of the ATS control system, a tracking error signal eb of the ATS control system, and a tracking error signal er of the reference surface servo system.

"ybs" represents the position of the ATS spot SPbs. "yr" represents the position of a spot of the reference surface servo light.

"dtp" represents a distance in the disc radial direction between the recording spot SPbr and the ATS spot SPbs. That is, "dtp" corresponds to a track pitch of a track formed using the ATS scheme.

As illustrated in FIG. 9, the difference between the position ybs of the ATS spot SPbs and the target position r corresponds to the error signal eb. Similarly to a general tracking servo control system, the ATS control block 204 Ki(s) operates such that the error signal eb is zero in the ATS control system of this case.

Here, for the target position r, the operation block 207 adds the distance dtp to the position ybs of the ATS spot SPbs, and the operation block 206 delays this addition value. The distance dtp is added to the position ybs of the ATS spot SPbs, so that a value indicating the position of the recording spot SPbr at that time is obtained. In addition, it is assumed that the ATS spot SPbs and the recording spot SPbr are in the same position in the circumferential direction (that is, a position parallel to the disc radial direction).

The delay block 206 applies delay $Z^{-k}$ to the position of the recording spot SPbr as the addition value, so that the position of the recording spot SPbr before one rotation is obtained. That is, this indicates the current target position r of the ATS spot SPbs.

In the reference surface servo system, the operation block 203 adds the reference value OFS corresponding to eccentricity to the spot position yr of the reference surface servo light. The reference value OFS is generated by the eccentricity and the like, and corresponds to a shift amount in the tracking direction of the spot position yr of the reference surface servo light and the spot position ybs of the ATS light.

A sum of the operation block 202 for the output of the operation block 203 and the output of the ATS control block 204 is used as the tracking error signal er. For example, it can be said that this is obtained by adding a disturbance component with a high frequency (about 10 kHz) obtained in the reference surface servo system to the servo control signal of the ATS control system, in which the cutoff frequency, for example, is about 1 kHz as described above, after the error of the spot position shift is solved by the reference value OFS.

The reference surface servo block 201 operates such that the tracking error signal er is zero, and controls the driving of the actuator (the lens block 200) for driving the objective lens 20.

In the ATS+ scheme as described above, the following problems have occurred.

If high density recording is first performed, the irradiation positions of the recording light and the ATS light in the adjacent track servo (ATS) differ from each other in the disc circumferential direction.

This will be described with reference to FIG. 10A.

When the ATS is performed most simply, it is sufficient if a recording spot for the ATS spot SPbs is parallel to the disc radial direction (equal to the position in the disc circumferential direction) as indicated by a recording spot SPbr' in FIG. 10A.

Normally, an interval between the recording light and the ATS light, for example, is about 5 µm, and should not be set to a value smaller than 5 µm. When the recording spot for the ATS spot SPbs is parallel to the disc radial direction, a track pitch TP2 of a track formed using the ATS is about 5 µm (a limit value). However, the track pitch, for example, is approximately reduced to an optical limit, so that high density is obtained.

Then, while the distance between the recording light and the ATS light is being held, the positions in the circumferential direction of the recording light and the ATS light are shifted, so that the interval (=the track pitch) in the radial direction is reduced. That is, as illustrated in FIG. 10A, the positions in the circumferential direction of the ATS spot SPbs and the recording spot SPbr are allowed to be different from each other, so that a track pitch TP1 is obtained.

However, if the positions in the circumferential direction of the ATS light and the recording light are allowed to be different from each other, when a previously recorded track has eccentricity, there is a problem that the track pitch may be changed by the eccentricity.

This will be described with reference to FIG. 11.

Figure 11:
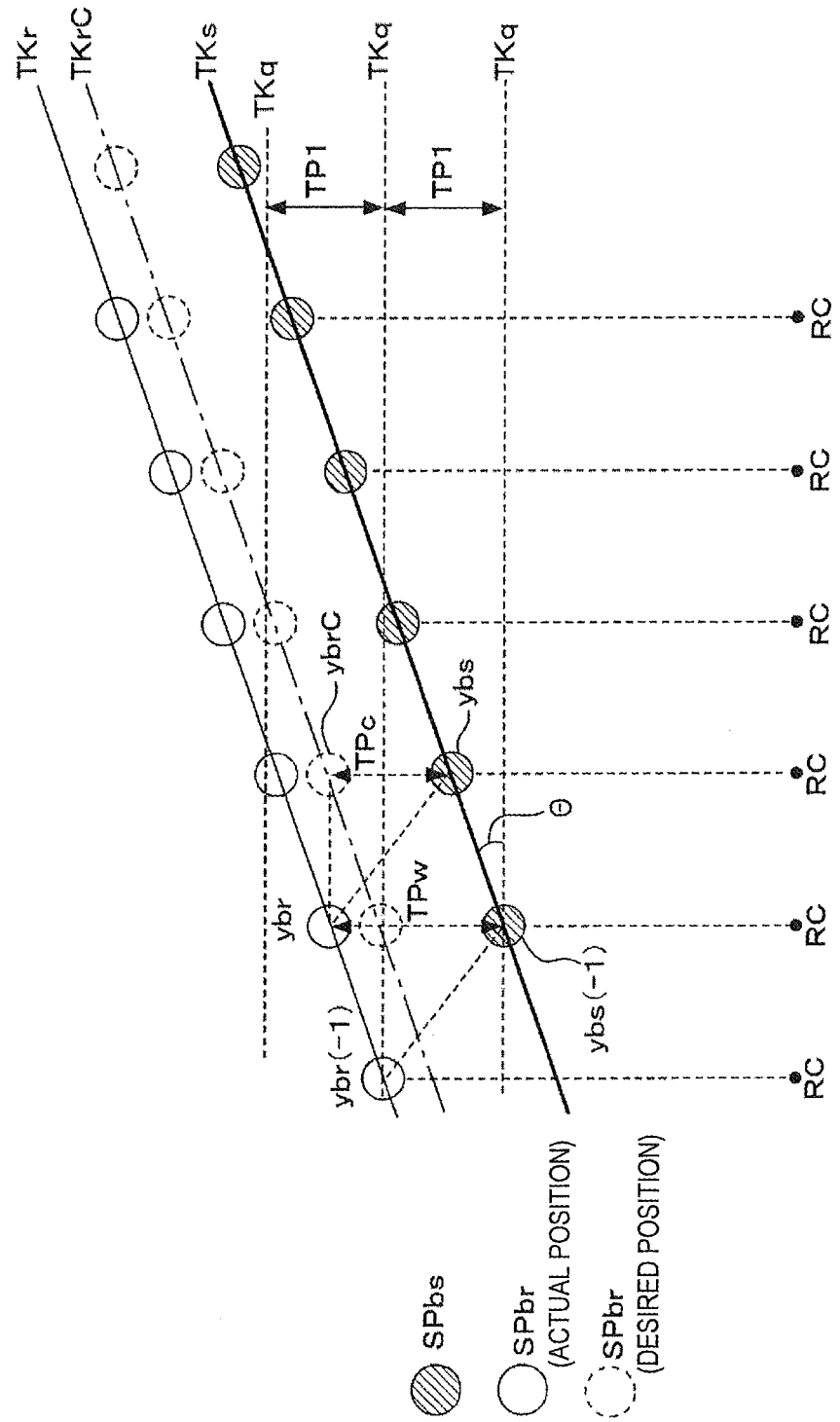
FIG. 11 is a diagram for explaining the relation of the difference in positions in the circumferential direction of a recording light and an ATS light and eccentricity.

In FIG. 11, tracks formed in a spiral shape on the disc are indicated by a straight line. A track TKq indicated by a broken line illustrates a track trajectory when no eccentricity occurs.

Meanwhile, tracks TKs and TKr indicated by solid lines illustrate a part of a track trajectory formed when eccentricity occurs.

The track TKs is a track along which the ATS light traces in the ATS and the track TKr is a track on which a mark string is formed by the recording light when the ATS light traces.

A track TKrC indicated by a dashed dotted line is a track having an originally formed track pitch TPc (=TP1).

That is, FIG. 11 illustrates the state in which the track TKr having a track pitch TPw, which is different from the original target track pitch TPc of the track, is formed by the influence of eccentricity.

In addition, in relation to the positional relation between the spot positions (ybs and the like) of the ATS spot SPbs and the spot positions (ybr and the like) of the recording spot SPbr, FIG. 11 illustrates the state in which positions RC are in the disc center (rotation).

If the eccentricity occurs, centers of circles to be formed on the track trajectories TKs and TKr to be formed are shifted differently from the ideal track trajectory TKq when no eccentricity occurs. At a certain part of the circumference, the track trajectory TK is inclined by an angle θ as illustrated in FIG. 11.

Here, when paying attention to the position Ybs (−1) of the ATS spot SPbs at a certain time point, the recording spot SPbr at that time point is a position Ybr (−1). This is because the positions in the circumferential direction of the recording light and the ATS light are shifted from each other as illustrated in FIG. 10A.

Similarly, when paying attention to the position Ybs of the ATS spot SPbs at the next time point, the recording spot SPbr at that time point is a position Ybr.

Here, this is considered to be a time point at which the ATS spot SPbs is in the position Ybs. In the ATS control system, the ATS spot SPbs is controlled to trace the track TKs.

Since the recording light and the ATS light are irradiated while being separated from each other by the track pitch TPc (=TP1) in the radial direction, a track having the track pitch TPc is formed by the ATS. However, in this case, according to an operation in which the objective lens 20 is controlled in the radial direction by the ATS control, the recording light is controlled to a position ybrC when viewed in the disc radial direction. However, at this time point, the recording spot SPbr is in the position ybr shifted to the position in the circumferential direction.

As a consequence, the recording light is irradiated along a trajectory for forming the track TKr, resulting in the formation of a track having the track pitch TPw different from the original target.

FIG. 11 illustrates places at which tracks to be formed have a wide track pitch. However, when eccentricity occurs, since circles having shifted center points overlap one another differently from the ideal track, there are places at which the track pitches of the tracks to be formed are smaller than the original pitch according to the positions in the circumferential direction.

That is, due to the eccentricity, the track pitch may be increased or decreased in one circulation.

The remainder amount of the servo error may be increased due to the change in the track pitch.

Figure 10B:
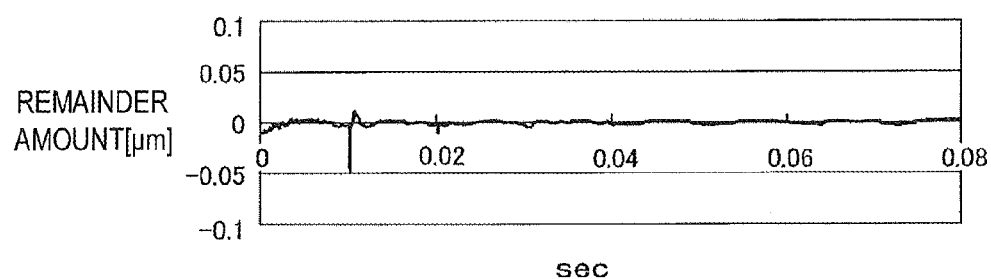
Figure 10C:
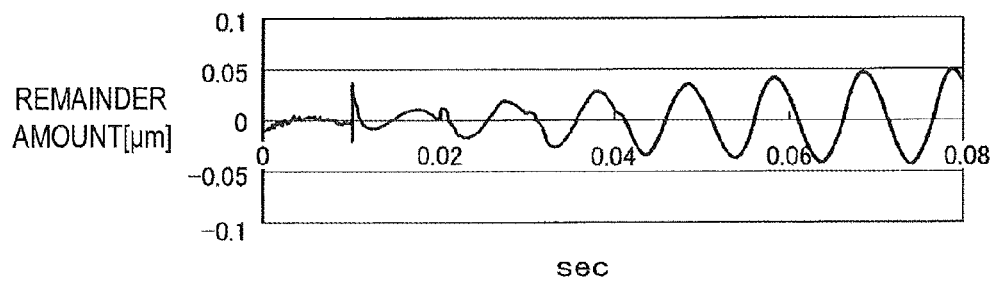

FIGS. 10A, 10B and 10C an example of the remainder due to the difference in the positions in the circumferential direction of the recording light and the ATS light.

FIG. 10B illustrates the remainder amount when the positions in the circumferential direction of the recording light and the ATS light are equal to each other (for example, in the case of the recording spot SPbr' illustrated in FIG. 10A), wherein the remainder amount shows a constant amplitude or less.

Meanwhile, FIG. 10C illustrates the remainder amount when the positions in the circumferential direction of the recording light and the ATS light are different from each other (for example, in the case of the recording spot SPbr illustrated in FIG. 10A), wherein the remainder amount is increased.

As described above, in order to reduce the track pitch, it is necessary to irradiate the recording light and the ATS light to different positions in the circumferential direction. However, in this case, a change occurs in the track pitch on the circumference by the eccentricity and the remainder of the tracking error signal is increased, so that the tracking servo is unstable.

<4. Servo Scheme of First Embodiment>

In this regard, in the present embodiments, when the recording light and the ATS light are irradiated to different positions in the circumferential direction, the remainder of the tracking error signal is reduced, so that the tracking servo operation is stable.

In each embodiment which will be described below, it is assumed that a corrected servo error signal, which is to be obtained when the ATS light and the recording light are irradiated to the same position in the circumferential direction, is obtained as a servo error signal based on a light receiving signal for the ATS light, and a tracking servo signal is generated using the correction servo error signal.

The first to third embodiments employ the ATS+ scheme. That is, using the corrected servo error signal and a reference surface servo error signal obtained based on a light receiving signal for the reference surface servo light, the tracking servo signal is generated.

To this end, the ATS-side filter 35 illustrated in FIG. 4 generates a corrected servo error signal for the tracking error signal TE-ap, generates the tracking servo signal TS-ats from the corrected servo error signal, and supplies the tracking servo signal TS-ats to the reference surface-side servo filter 37.

That is, this is a configuration in which a servo control signal based on the corrected servo error signal is provided to the tracking servo loop for generating the tracking servo signal based on the tracking error signal TE-sv of the reference surface servo system.

The first embodiment will be described.

FIG. 12A illustrates the spot positions of the ATS light and the recording light in the first embodiment. A track TKs is a previously formed track, and a new track TKr is formed by the recording light in the state in which the ATS light has traced the track TKs.

Here, the position in the circumferential direction of the recording spot SPbr is allowed to be different from that of the ATS spot SPbs, so that a narrow track pitch is obtained.

In this case, in the first embodiment, one sub-ATS spot SPbh is formed using the ATS spot SPbs as a main ATS spot. A simple description has been given in FIG. 3. However, in this case, ATS lights of main and sub systems are irradiated onto the recording layers of the bulk-type recording medium 1 as the ATS light.

To this end, in the configuration of FIG. 3, two ATS•reproduction lasers 11ap are provided, the ATS•reproduction laser 11ap is prepared in the form of a multibeam laser diode, or the main ATS light and the sub-ATS light are formed through the grating of the ATS light from the ATS•reproduction laser 11ap.

The main ATS light and the sub-ATS light are irradiated such that the positions in the circumferential direction of the main ATS light and the sub-ATS light are symmetrical to each other while the position in the circumferential direction of the recording light is interposed therebetween.

In the example illustrated in FIG. 12A, the main ATS light (a main ATS spot SPbs) is irradiated such that the position in the circumferential direction of the main ATS light is advanced to be earlier than the recording light (the recording spot SPbr) in the track travel direction. In this case, the position in the circumferential direction of the sub-ATS light (a sub-ATS spot SPbh) follows the recording light (the recording spot SPbr).

An intermediate point (a position ybx indicated by a broken line circle) between the main ATS spot SPbs and the sub-ATS spot SPbh is parallel to the recording spot SPbr in the radial direction.

That is, in the first embodiment, two ATS lights are used and the position in the circumferential direction of the recording light is in the intermediate point between the two ATS lights. In order to solve (reduce) a change in the track pitch due to the eccentricity described in FIG. 11, a corrected tracking error signal derived from light receiving signals of the two ATS lights through an operation is used. As a consequence, it is possible to perform a tracking servo in which the recording light is in a corrected position state, for example, the recording light is in a position state for forming the track TKrC of FIG. 11.

For the adjacent track servo in the ATS+ scheme, as a position signal of an adjacent track used in the position correction of the recording light, it is necessary to provide a position signal of the ATS light having the same position in the circumferential direction as that of the recording light (the ATS light parallel to the recording light in the radial direction).

In this regard, for a radius linking the recording light to the disc rotation center, the sub-ATS light before interpolation is irradiated to a position linearly symmetrical to the main ATS light.

At this time, the position signal of the ATS light having a position ybx equal to the position in the circumferential direction of the recording light can be approximately obtained as an arithmetic average of the position signals of the main ATS light and the sub-ATS light.

Figure 13A:
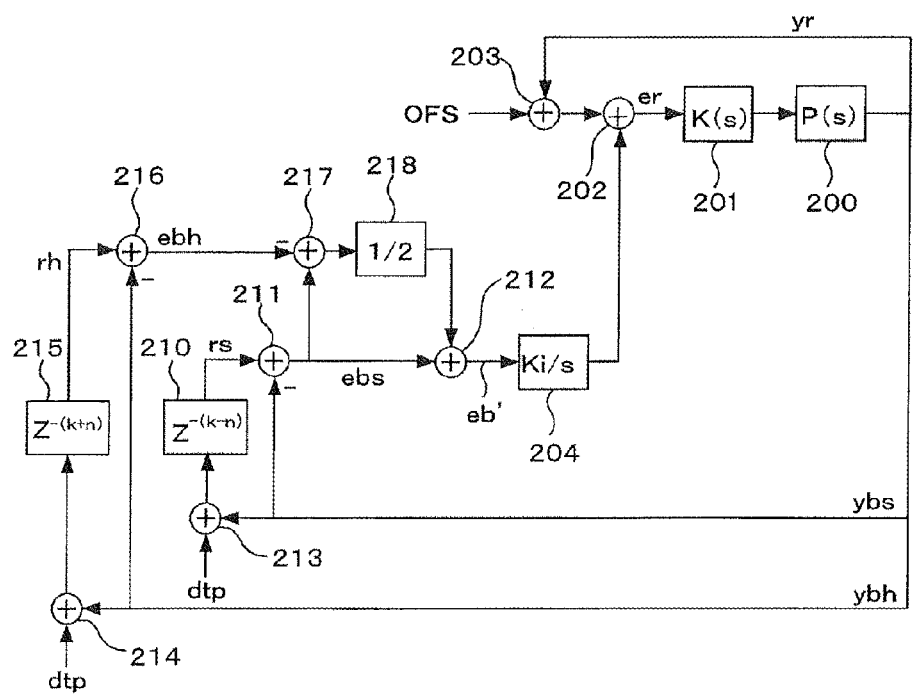
FIGS. 13A and 13B are diagrams for explaining a servo control system and a remainder amount of a first embodiment.

FIG. 13A illustrates a servo control system of the first embodiment. This is obtained by adding feature elements of the first embodiment to the configuration of the ATS+ servo system of FIG. 9. The same reference numerals are used to designate the same elements as those of FIG. 9 and a description thereof will be omitted.

Transfer function blocks not illustrated in FIG. 9 include operation blocks 211, 212, 213, 214, 216, and 217, delay blocks 210 and 215, and a division block 218.

In this case, ybs represents the position of the main ATS spot SPbs and ybh represents the position of the sub-ATS spot SPbh.

$Z^{-k}$ represents that a signal is delayed for a time corresponding to one rotation of the disc. Similarly, $Z^{-n}$ also represents delay. However, $Z^{-n}$ represents that a signal is delayed for a time corresponding to shift of the positions in the circumferential direction of the recording light and the main ATS light.

Thus, $Z^{-(k-n)}$ indicating the delay block 210 represents that a predetermined signal is delayed for a time obtained by subtracting the time corresponding to the shift of the positions in the circumferential direction of the recording light and the main ATS light from one rotation of the disc.

Furthermore, $Z^{-(k+n)}$ indicating the delay block 215 represents that a predetermined signal is delayed for a time obtained by adding the time corresponding to the shift of the positions in the circumferential direction of the recording light and the main ATS light to one rotation of the disc.

The operation block 213 adds the distance dtp (corresponding to the track pitch) to the position ybs of the main ATS spot SPbs. Then, a target position rs is obtained through the delay block 210. Then, the difference between the position ybs obtained by the operation block 211 and the target position rs is an error signal ebs for the main ATS light.

The operation block 214 adds the distance dtp to the position ybh of the sub-ATS spot SPbh, and a target position rh is obtained through the delay block 215. Then, the difference between the position ybh obtained by the operation block 216 and the target position rh is an error signal ebh for the sub-ATS light.

The operation block 217 calculates the difference between the error signal ebs and the error signal ebh and the division block divides a difference value in half. Then, the operation block 212 adds a divided value to the error signal ebs. This sum is a corrected servo error signal ebs'.

Figure 12B:
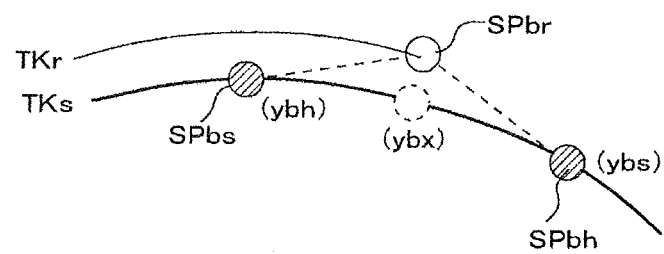

That is, this represents an error signal, which is obtained for the spot of the position ybx of FIGS. 12A and 12B, obtained by adding ½ of the difference between the error signal ebs for the main ATS light and the error signal ebh for the sub-ATS light to the error signal ebs for the main ATS light.

An ATS control block 204 (Ki/s) operates such that the corrected servo error signal ebs' is zero, and supplies a tracking control signal to the operation block 202. That is, a control signal of the ATS system is provided to the reference surface servo system.

In the reference surface servo system, the operation block 203 adds the reference value OFS corresponding to eccentricity to the spot position yr of the reference surface servo light. A sum of the operation block 202 for the output of the operation block 203 and the output of the ATS control block 204 is used as the tracking error signal er.

The reference surface servo block 201 operates such that the tracking error signal er is zero, and controls the driving of the actuator (the lens block 200) for driving the objective lens 20.

In addition, when the processes of the above blocks are considered in light of the actual configuration of FIG. 4, the reference surface servo block 201 and the operation blocks 202 and 203 correspond to the process of the reference surface-side servo filter 37.

Furthermore, the ATS control block 204, the operation blocks 211, 212, 213, 214, 216, and 217, the delay blocks 210 and 215, and the division block 218 correspond to the process of the ATS-side filter 35.

As described above, in the first embodiment, by two ATS lights symmetrical to each other in the circumferential direction with the recording light interposed therebetween, the corrected servo error signal is used as an approximate value of an error signal by a virtual ATS light having the same position in the circumferential direction as that of the recording light.

In this way, the adjacent track servo is performed in virtually same position in the circumferential direction of the recording light and the ATS light (the state in which the recording light and the ATS light are parallel to each other on a radius line toward the disc rotation center), so that it is possible to solve the change in the track pitch due to the eccentricity as described in FIG. 11.

As a consequence, it is possible to reduce the remainder of the tracking error component due to the difference in the positions of the recording light in the circumferential direction of the recording light and the ATS light, and to stabilize the tracking servo.

Figure 13B:
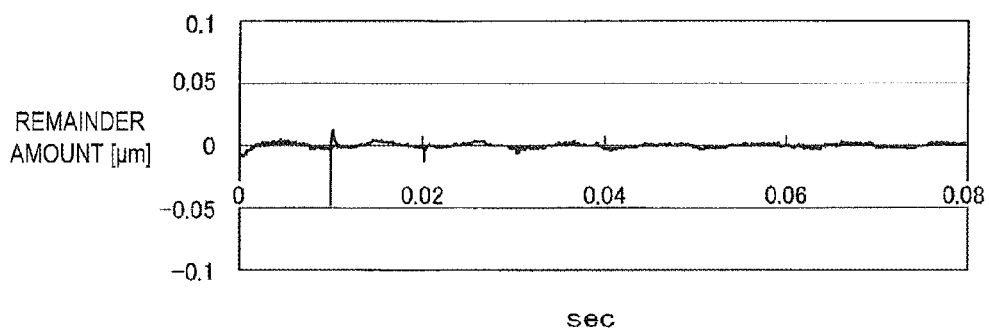

FIG. 13B illustrates a remainder amount in the first embodiment. As compared with FIG. 10B and FIG. 10C, it can be understood that the remainder is reduced until FIG. 13B is approximately equal to FIG. 10B (when the positions in the circumferential direction of the recording light and the ATS light are equal to each other).

In addition, FIG. 12A illustrates the case in which, when the main ATS light is advanced to be earlier than the recording light, the sub-ATS light is irradiated to a symmetrical position following the recording light. However, an opposite case is possible.

That is, when the main ATS light follows the recording light as illustrated in FIG. 12B, the sub-ATS light is irradiated to a symmetrical position advanced to be earlier than the recording light.

<5. Servo Scheme of Second Embodiment>

Even in the second embodiment, the corrected servo error signal is used. In this case, the position difference in the disc radial direction between the current spot position of the ATS light and a spot position at the time point at which the ATS light is in the same position in the disc circumferential direction as a current recording light, is added to the servo error signal based on a light receiving signal for the ATS light, so that the corrected servo error signal is obtained.

In addition, in the second embodiment, one ATS light is used. Furthermore, it is assumed that the ATS light is irradiated such that the position of the ATS light in the disc circumferential direction is advanced to be earlier than the recording light in the track travel direction.

In this case, the above position difference is added to the servo error signal at the time point at which the ATS light is in the same position in the disc circumferential direction as the current recording light, so that the corrected servo error signal is obtained.

Figure 14:
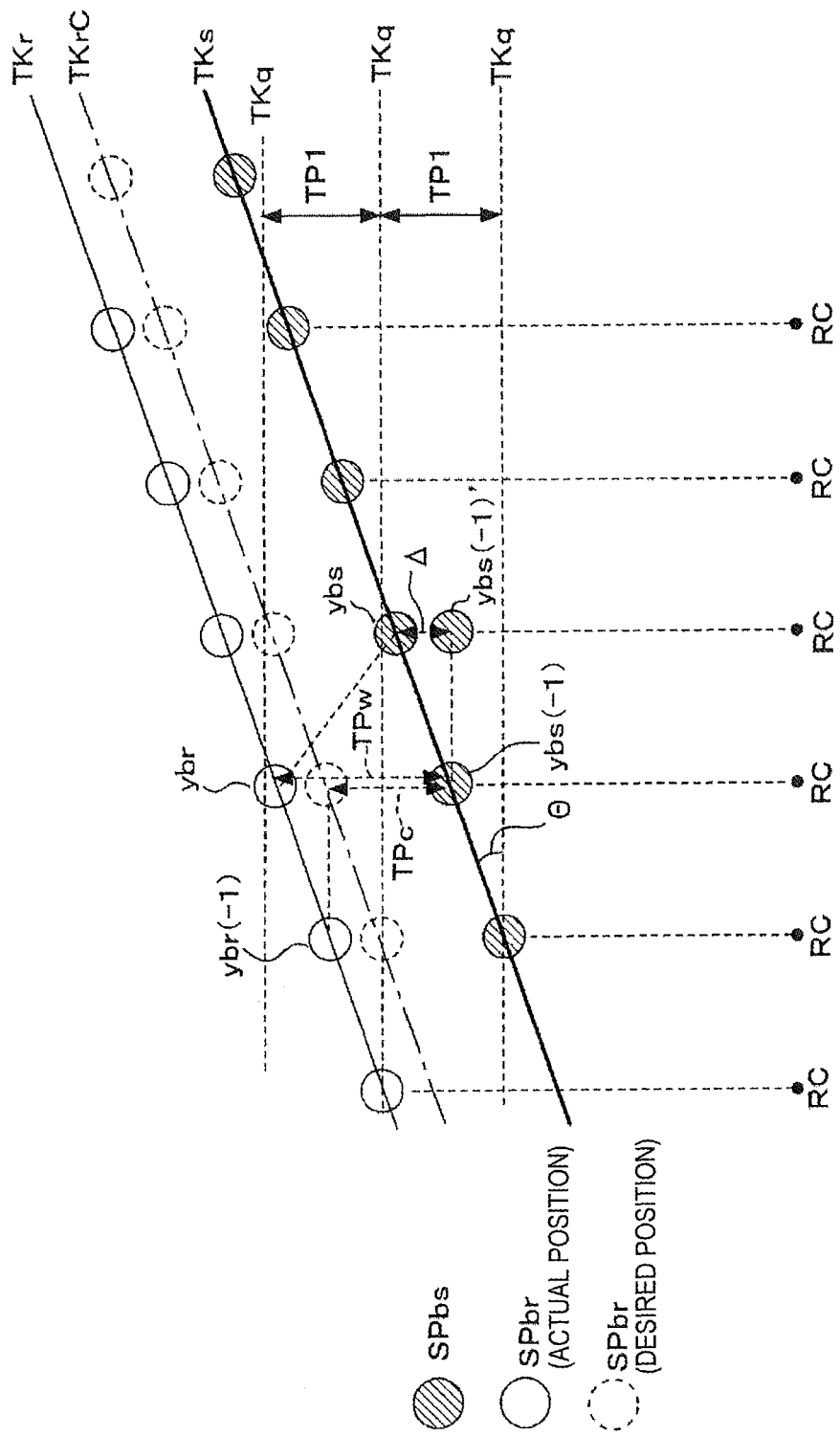
FIG. 14 is a diagram for explaining a point of view of a correction scheme of a second embodiment.

A point of view will be described with reference to FIG. 14. FIG. 14 illustrates an ideal track TKq and tracks TKs and TKr formed when eccentricity occurs, similarly to FIG. 11.

Originally, a track TKrC should be formed. However, the track TKr is formed by the influence of the eccentricity as described above.

Here, the position ybr of the recording light has been separated from the track TKs by a track pitch TPw. However, in order to correct the track pitch TPw to a track pitch TPc, it is sufficient if the position difference indicated by $\Delta$ in FIG. 14 is added to a servo error signal at the time point at which the ATS light is in the same position ybs (−1) in the disc circumferential direction as the position ybr of the current recording light.

As apparent from FIG. 14, the position difference $\Delta$ is the position difference in the disc radial direction between the current spot position ybs of the ATS light and a spot position ybs (−1) at the time point at which the ATS light is in the same position in the disc circumferential direction as the position ybr of the current recording light. In detail, the position difference $\Delta$ is the difference between the position ybs and a position ybs (−1)' when the position ybs (−1) is set as the position ybs (−1)' parallel to the position ybs in the radial direction as the same circumferential position as the current spot position ybs of the ATS light.

Servo control for the current recording light (the position ybr) is performed using the corrected servo error signal obtained by adding the position difference $\Delta$ to an error signal according to the ATS light of the position ybs (−1), so that it is possible to control the trajectory of the recording light to trace the track TKrC.

A change in the track pitch due to the difference between the positions in the circumferential direction of the recording light and the ATS light occurs due to the eccentricity of the disc. This is because the difference occurs between the distance from the rotation center of the ATS light and the distance from the rotation center of the recording light when the eccentricity of the disc occurs.

A track (a mark string) is formed by the recording light at a position separated from the distance from the rotation center of the ATS light by a track pitch in the radial direction. However, in the position of the recording light, the distance from the rotation center of a track is changed due to the eccentricity of the disc. Therefore, the track pitch is changed by the difference with the distance from the rotation center when the track has been formed.

Thus, if the position of the ATS light is corrected by the difference, it is possible to hold a track pitch with an adjacent track in the position of the recording light to a desired value.

Figure 15A:
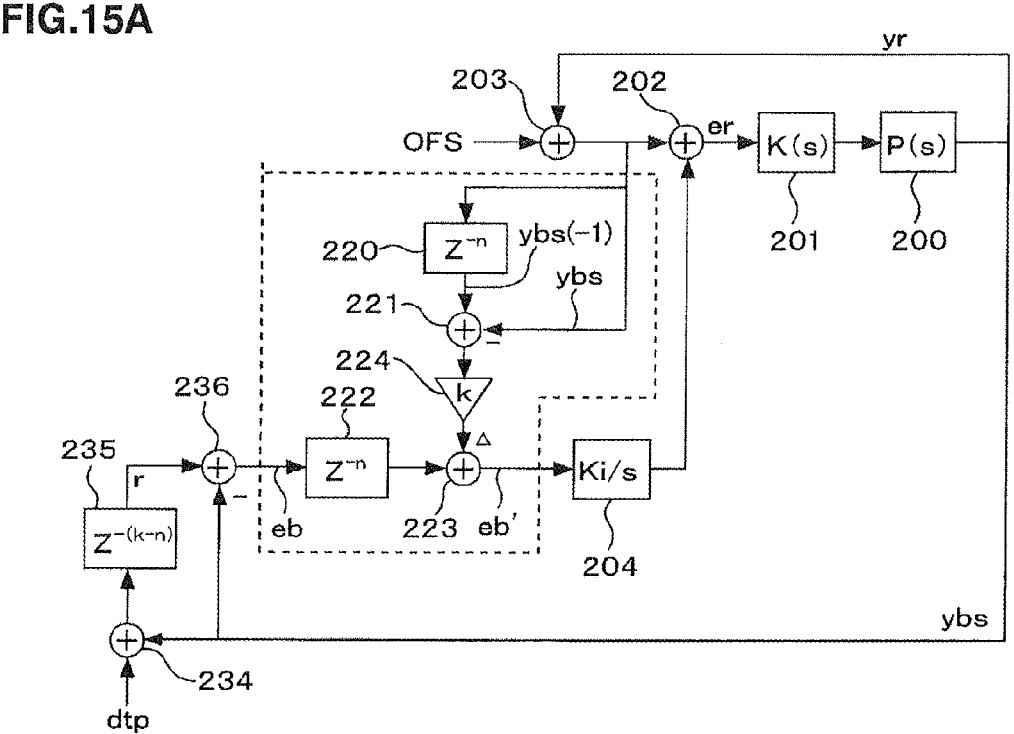
FIGS. 15A and 15B are diagrams for explaining a servo control system and a remainder amount of a second embodiment.

FIG. 15A illustrates a servo control system of the second embodiment. The same reference numerals are used to designate the same elements as those of FIG. 9 and FIG. 13A.

In this case, operation blocks 221 and 223, delay blocks 220 and 222, and a gain block 224 surrounded by a broken line constitute a section for calculating the position difference Δ.

Similarly to FIG. 13A, $Z^{-k}$ represents that a signal is delayed for a time corresponding to one rotation of the disc. $Z^{-n}$ represents that a signal is delayed for a time corresponding to shift of the positions in the circumferential direction of the recording light and the main ATS light. Thus, $Z^{-(k-n)}$ represents that a predetermined signal is delayed for a time obtained by subtracting the time corresponding to the shift of the positions in the circumferential direction of the recording light and the ATS light from one rotation of the disc.

The operation block 234 adds the distance dtp (corresponding to the track pitch) to the position ybs of the ATS spot SPbs, and a target position r is obtained through the delay block 235. Then, the difference between the position ybs obtained by the operation block 236 and the target position r is an error signal eb for the ATS light.

The operation block 203 adds the reference value OFS to the spot position yr of the reference surface servo light. The reference value OFS corresponds to a shift amount of the reference surface servo light and the ATS light due to eccentricity. (Refer to FIG. 8B. FIG. 8B illustrates the shift amounts of P1 and P2 based on the relation between the recording light and the reference surface servo light. However, "the shift amount" in FIG. 15A is obtained by replacing P1 and P2 with the reference surface servo light and the ATS light.)

The output of the operation block 203 corresponds to the spot position ybs of a current ATS light.

The delay block 220 delays the position ybs by $Z^{-n}$, thereby obtaining the spot position ybs (−1) of the ATS light at the time point at which the ATS light is in the same position in the circumferential direction as a current recording light.

The operation block 221 subtracts the position ybs from the position ybs (−1), thereby calculating the position difference Δ. The position difference Δ is supplied to the operation block 223 after the gain block 224 applies an adjustment gain to the position difference Δ.

Meanwhile, the delay block 222 delays the error signal eb by $Z^{-n}$, so that an error signal for the spot position ybs (−1) of the ATS light at the time point at which the ATS light is in the same position in the circumferential direction as the current recording light is supplied to the operation block 223. Then, the operation block 223 adds the position difference Δ to the delayed error signal eb, thereby obtaining a corrected servo error signal eb'.

That is, this represents that the position difference Δ in the disc radial direction between the current spot position of the ATS light and a spot position at the time point at which the ATS light is in the same position in the disc circumferential direction as that of the current recording light is added to the servo error signal at the time point at which the ATS light is in the same position in the disc circumferential direction as the current recording light, so that the corrected servo error signal is obtained.

The ATS control block 204 (Ki/s) operates such that the corrected servo error signal eb' is zero, and supplies a tracking control signal to the operation block 202. That is, a control signal of the ATS system is provided to the reference surface servo system.

In the reference surface servo system, a sum of the operation block 202 for the output of the operation block 203 and the output of the ATS control block 204 is used as the tracking error signal er.

The reference surface servo block 201 operates such that the tracking error signal er is zero, and controls the driving of the actuator (the lens block 200) for driving the objective lens 20.

In addition, when the processes of the above blocks are considered in light of the actual configuration of FIG. 4, the reference surface servo block 201 and the operation blocks 202 and 203 correspond to the process of the reference surface-side servo filter 37.

Furthermore, the ATS control block 204, the operation blocks 234, 236, 221, and 222, the delay blocks 235, 222 and 220, and the gain block 224 correspond to the process of the ATS-side filter 35.

In the servo control system, in the ATS+ scheme, it can be said that a beam shift interpolation section (a calculation section of the position difference Δ) indicated by a broken line is included in a control loop.

That is, the beam shift interpolation section adds the difference between the position signal of an ATS light, which is obtained by the reference surface Ref (the reference value OFS), and the position signal of an ATS light, which is in a position delayed from the ATS light by $Z^{-n}$ in the circumferential direction, to an error signal for a track adjacent to the position of the current recording light, through which an ATS light advanced to be earlier than the recording light has passed, and hands over a sum to the servo control system as a corrected value.

According to the second embodiment, the difference in the positions in the circumferential direction of the recording light and the ATS light is corrected using a value obtained by performing an operation for the position signal of the ATS light and the error signal of the ATS light at the recording layer, so that it is possible to reduce the remainder of the tracking error component due to the difference in the positions in the circumferential direction of the recording light and the ATS light, and to stabilize the tracking servo.

Figure 15B:
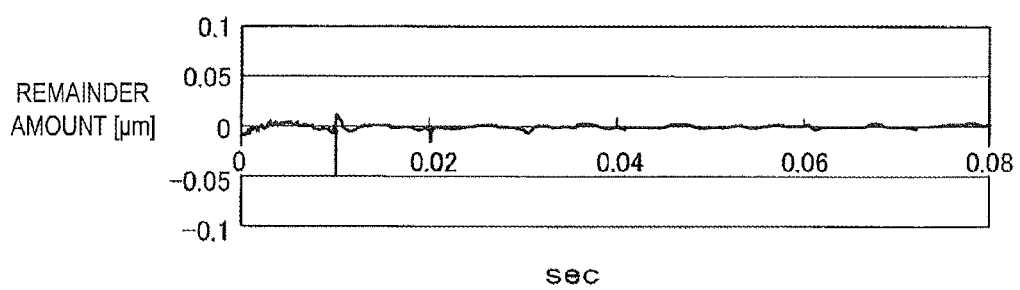

FIG. 15B illustrates a remainder amount in the second embodiment. It can be understood that the remainder is reduced until FIG. 15B is approximately equal to FIG. 10B.

Furthermore, in the case of the second embodiment, since the number of the ATS lights is one as compared with the first embodiment, the second embodiment has an advantage that an optical system has a simple configuration.

Figure 16:
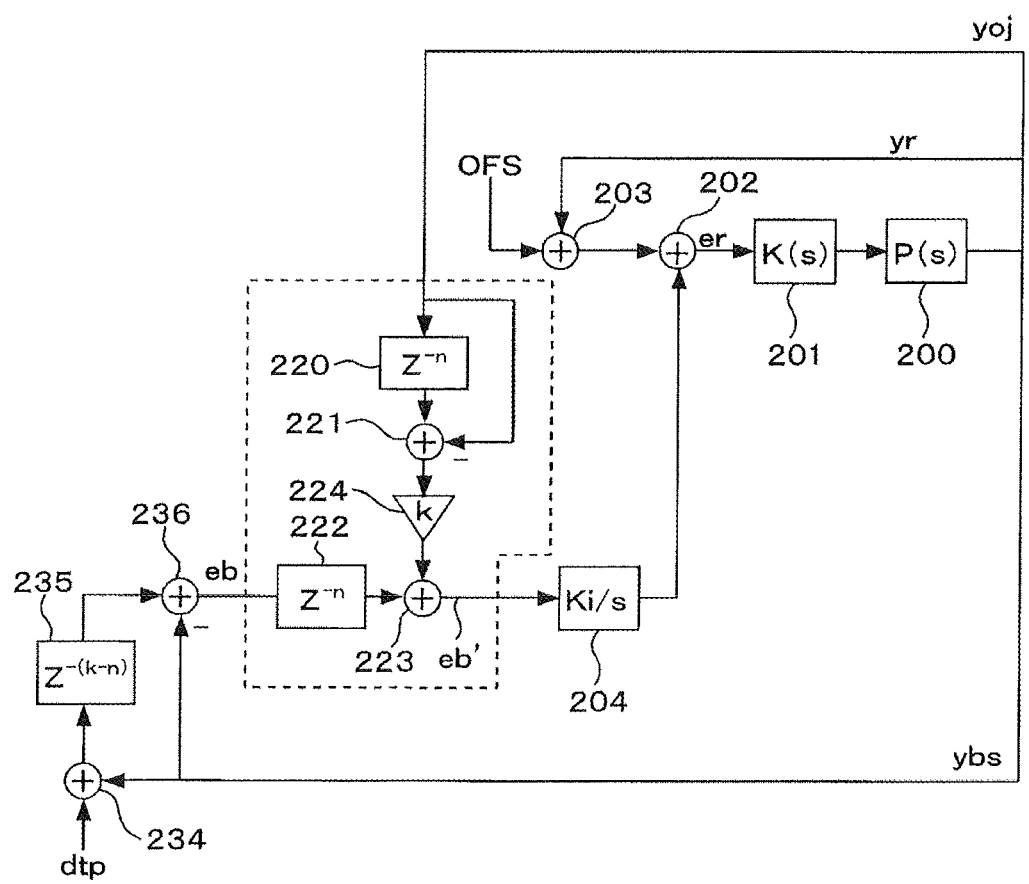
FIG. 16 is a block diagram of a servo control system of a modification of a second embodiment.

FIG. 16 illustrates a modification of the second embodiment. In addition, the same reference numerals are used to designate the same elements as those of FIG. 15A and a description thereof will be omitted.

In the example of FIGS. 15A and 15B, information on the spot position ybs of the current ATS light is obtained using the reference value OFS. However, the lens position sensor 45 illustrated in FIG. 4 may also be used. It is possible to obtain the position information of the ATS light from information on lens shift corresponding to eccentricity from the lens position sensor 45.

FIG. 16 illustrates an example in which a position yoj obtained from the lens position sensor 45 is set as the spot position ybs of a current ATS light used in correction, and is supplied to the delay block 220 and the operation block 221. Other operations are the same as those of FIGS. 15A and 15B.

<6. Servo Scheme of Third Embodiment>

The third embodiment has basically the same point of view as the second embodiment, except that the ATS light is irradiated such that the position in the circumferential direction of the ATS light follows the recording light in the track travel direction.

In this case, the position difference between the current spot position of the ATS light and a spot position at the time point at which the ATS light and the current recording light are in the same position in the disc circumferential direction is added to the servo error signal for the current ATS light, so that the corrected servo error signal is obtained.

Figure 17:
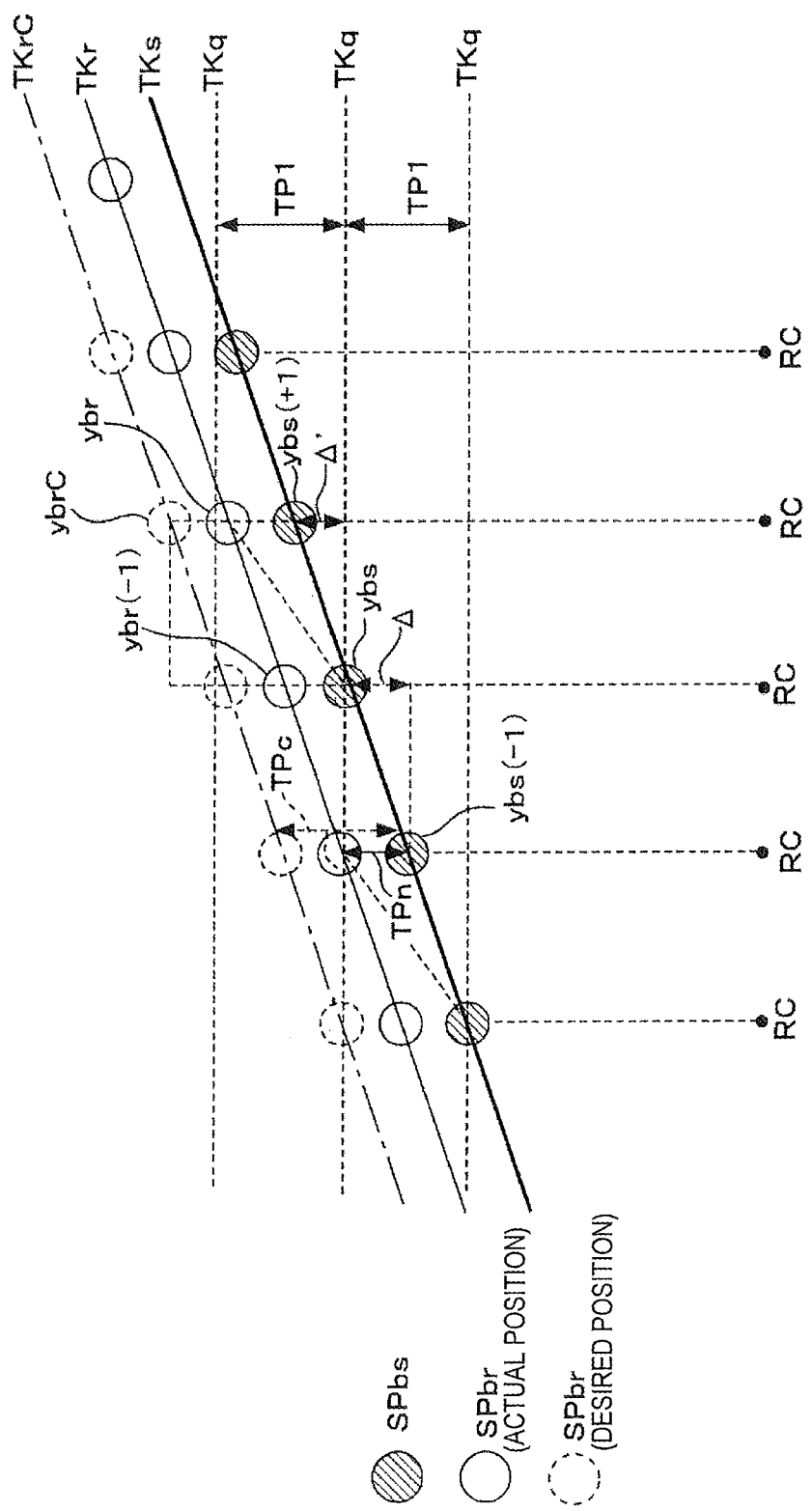
FIG. 17 is a diagram for explaining a point of view of a correction scheme of a third embodiment.

FIG. 17 illustrates an ideal track TKq and tracks TKs and TKr formed when eccentricity occurs, similarly to FIG. 14.

If the tracks TKs and TKr indicate certain parts of circumference at which each of the tracks TKs and TKr has an angle θ with respect to the ideal track TKq in the same situation as in FIG. 14, when the recording light is advanced, the track TKr, which has a track pitch TPn narrower than the original track pitch TPc (=TP1), is formed as illustrated in FIG. 17.

Here, the position ybr of the recording light has been separated from the track TKs by the track pitch TPn. However, in order to correct the track pitch TPn to a track pitch TPc, the position difference Δ illustrated in FIG. 17 is added to a servo error signal for the current ATS light. Thus, it is possible to control the position of the current recording light to a position ybrC.

The position difference Δ is indicated as the difference in the radial direction between the current spot position ybs of the ATS light and a spot position ybs (−1) of a previous time in FIG. 17. However, the position difference Δ is equal to a position difference Δ' in the radial direction between the current spot position ybs of the ATS light and a spot position ybs (+1) at a (future) time point, at which the ATS light is in the same position in the disc circumferential direction as the position of the current recording light. Thus, it is possible to obtain the position difference Δ=Δ' from information on the position ybs (−1).

Servo control for the current recording light (the position ybr) is performed using the corrected servo error signal obtained by adding the position difference Δ to an error signal according to the ATS light of the current position ybs, so that it is possible to control the trajectory of the recording light to trace the track TKrC.

Figure 18:
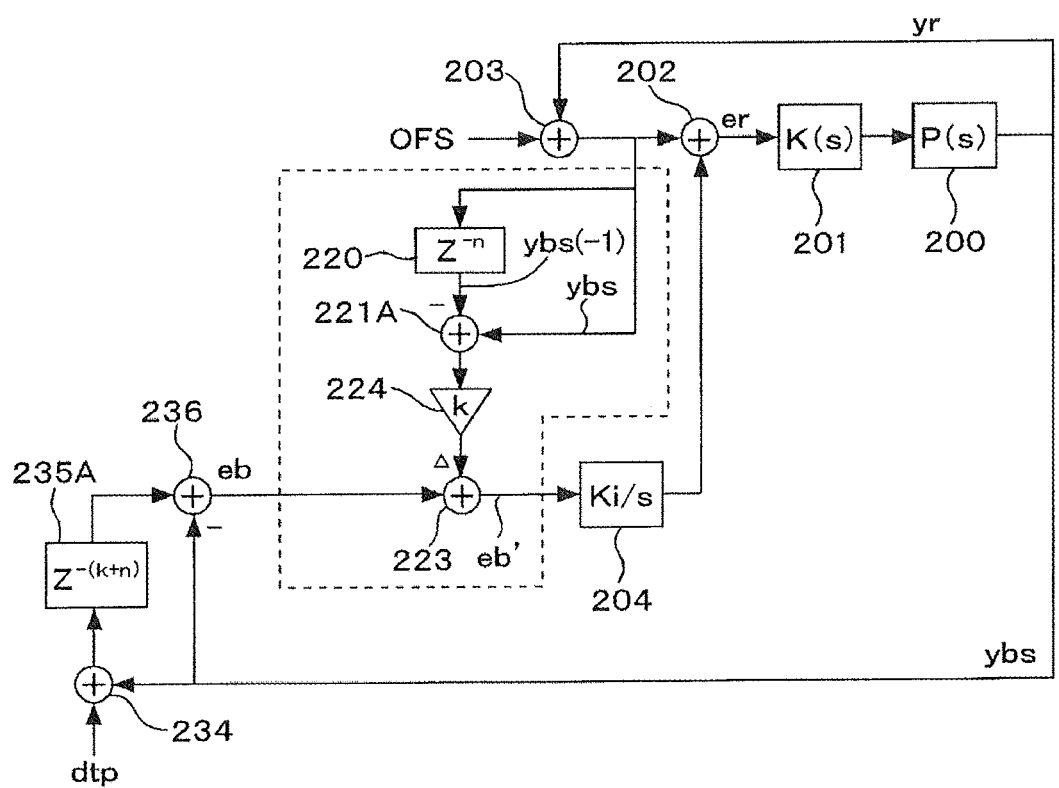
FIG. 18 is a block diagram of a servo control system of a third embodiment.

FIG. 18 illustrates a servo control system of the third embodiment. The same reference numerals are used to designate the same elements as those of FIG. 9 and FIG. 15A. In this case, operation blocks 221A and 223, a delay block 220, and a gain block 224 surrounded by a broken line constitute a section for calculating the position difference Δ.

In addition, since the position difference Δ is added to an error signal according to the ATS light of the current position ybs, a delay block corresponding to the delay block 222 in FIG. 15A is not provided.

Similarly to the above, $Z^{-k}$ represents that a signal is delayed for a time corresponding to one rotation of the disc, and $Z^{-n}$ represents that a signal is delayed for a time corresponding to shift of the positions in the circumferential direction of the recording light and the main ATS light. However, since the recording light is advanced to be earlier than the ATS light, a delay block 235A delays a signal by $Z^{-(k+n)}$ obtained by adding the time corresponding to shift of the positions in the circumferential direction of the recording light and the ATS light to one rotation of the disc.

The operation block 234 adds the distance dtp (corresponding to the track pitch) to the position ybs of the ATS spot SPbs, and a target position r is obtained through the delay block 235A. Then, the difference between the position ybs obtained by the operation block 236 and the target position r is an error signal eb for the ATS light.

Similarly to FIG. 15A, the output of the operation block 203 corresponds to the spot position ybs of the current ATS light. The delay block 220 delays the position ybs by $Z^{-n}$ to obtain the spot position ybs (−1) of the ATS light in the position in the circumferential direction of the previous time.

The operation block 221A subtracts the position ybs (−1) from the position ybs, thereby obtaining the position difference Δ. As described above, the position difference Δ is equal to Δ'.

The position difference Δ is supplied to the operation block 223 after the gain block 224 applies an adjustment gain to the position difference Δ.

Then, the operation block 223 adds the position difference Δ to the error signal eb, thereby obtaining a corrected servo error signal eb'.

That is, this represents that the position difference Δ' (Δ) in the disc radial direction between the current spot position of the ATS light and a spot position at the time point at which the ATS light is in the same position in the disc circumferential direction as the current recording light is added to the servo error signal for the current ATS light, so that the corrected servo error signal is obtained.

The ATS control block 204 (Ki/s) operates such that the corrected servo error signal eb' is zero, and supplies a tracking control signal to the operation block 202. That is, a control signal of the ATS system is provided to the reference surface servo system.

In the reference surface servo system, a sum of the operation block 202 for the output of the operation block 203 and the output of the ATS control block 204 is used as the tracking error signal er.

The reference surface servo block 201 operates such that the tracking error signal er is zero, and controls the driving of the actuator (the lens block 200) for driving the objective lens 20.

In addition, when the processes of the above blocks are considered in light of the actual configuration of FIG. 4, the reference surface servo block 201 and the operation blocks 202 and 203 correspond to the process of the reference surface-side servo filter 37.

Furthermore, the ATS control block 204, the operation blocks 234, 236, 221A, and 222, the delay blocks 235A and 220, and the gain block 224 correspond to the process of the ATS-side filter 35.

Even in the servo control system, similarly to the second embodiment, in the ATS+ scheme, it can be said that a beam shift interpolation section (a calculation section of the position difference Δ) indicated by a broken line is included in a control loop.

That is, the beam shift interpolation section adds the difference Δ between the position signal of an ATS light, which is obtained by the reference surface Ref (the reference value OFS), and the position signal of an ATS light, which is in a position advanced from the ATS light by $Z^{+n}$ in the circumferential direction, to an error signal for a track adjacent to the position of the current recording light, and hands over a sum to the servo control system as a corrected value.

Even in the third embodiment, the same effects as those of the second embodiment are obtained.

Figure 19:
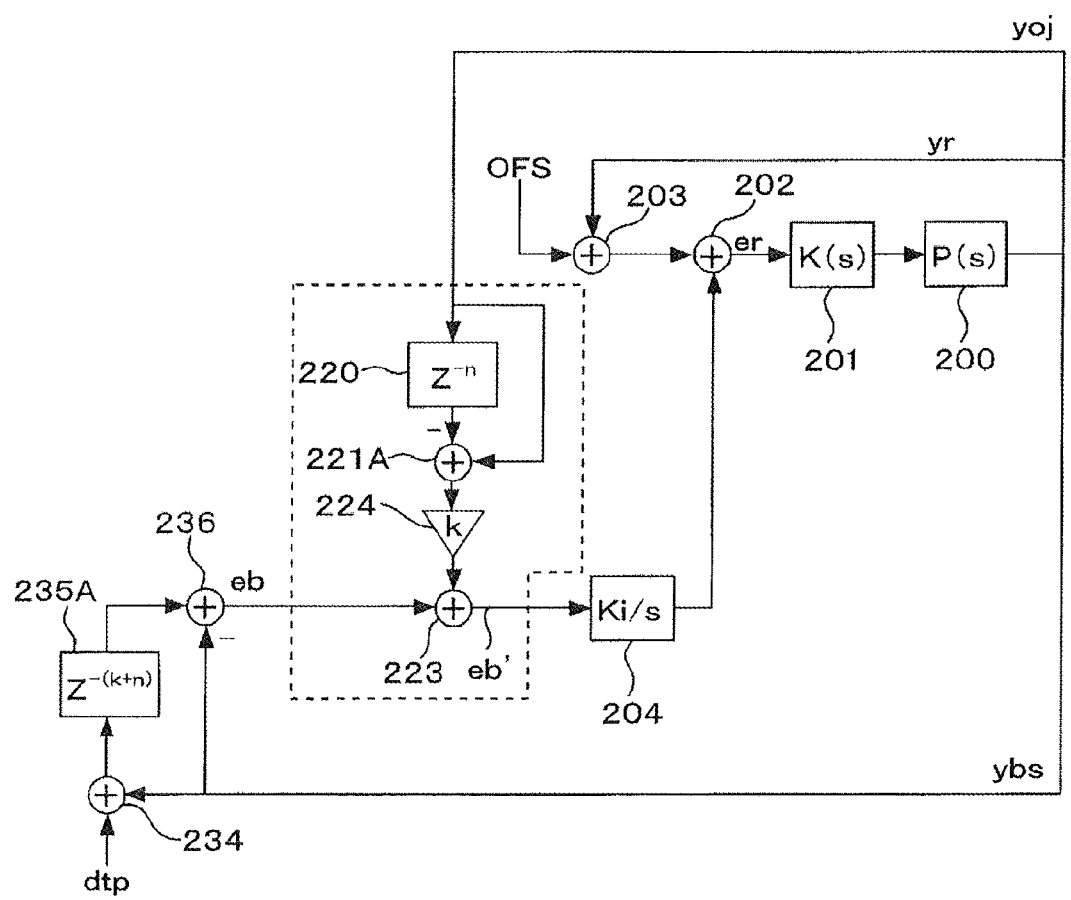
FIG. 19 is a block diagram of a servo control system of a modification of a third embodiment.

FIG. 19 illustrates a modification of the third embodiment. In addition, the same reference numerals are used to designate the same elements as those of FIG. 18 and a description thereof will be omitted.

Similarly to the example described in FIG. 16, FIG. 19 illustrates an example in which the position information of the ATS light is obtained using the lens position sensor 45 illustrated in FIG. 4.

In FIG. 19, a position yoj obtained from the lens position sensor 45 is set as the spot position ybs of the current ATS light used in correction, and is supplied to the delay block 220 and the operation block 221.

<7. Modification>

So far, the embodiments have been described. However, the technology of the present disclosure is not limited to the above examples.

The embodiments are based on the ATS+ scheme. However, the technology using the corrected servo error signal is also applicable to the ATS scheme.

Furthermore, a recording medium for which a recording apparatus performs recording is not limited to the bulk-type recording medium 1. Other types of optical discs may also be used.

Furthermore, it goes without saying that the recording apparatus or the servo control system may also have various configurations.

Additionally, the present technology may also be configured as follows.

(1) A recording apparatus including:
a light irradiation and receiving unit configured to irradiate recording light for performing mark recording to a recording layer and an adjacent servo light for an adjacent track servo onto an optical disc recording medium having the recording layer through a common objective lens, and to receive reflected light from the recording layer of the adjacent servo light, the adjacent servo light having an irradiation position different from a position in a disc circumferential direction of the recording light and being separated from the recording light by a predetermined distance in a disc radial direction;
a tracking mechanism configured to drive the objective lens in a tracking direction which is the disc radial direction;
a tracking servo signal generation unit configured to obtain a corrected servo error signal as a servo error signal based on a light receiving signal for the adjacent servo light, and to generate a tracking servo signal using the corrected servo error signal, the corrected servo error signal being obtained when the adjacent servo light has been irradiated in a same position in the disc circumferential direction as a position of the recording light; and
a tracking driving unit configured to drive the tracking mechanism based on the tracking servo signal.

(2) The recording apparatus according to (1),
wherein the optical disc recording medium has a reference surface provided with a position director formed in a depth position different from the position of the recording light,
wherein the light irradiation and receiving unit is configured to irradiate the recording light, the adjacent servo light, and reference surface servo light for performing position control based on the position director formed in the reference surface onto the optical disc recording medium through the common objective lens, and to individually receive the reflected light from the recording layer of the adjacent servo light and reflected light from the reference surface of the reference surface servo light, and
wherein the tracking servo signal generation unit is configured to generate the tracking servo signal using the corrected servo error signal, and a reference surface servo error signal obtained based on a light receiving signal for the reference surface servo light obtained by the light irradiation and receiving unit.

(3) The recording apparatus according to (2), wherein the tracking servo signal generation unit is configured to provide a servo control signal based on the corrected servo error signal to a tracking servo loop for generating a tracking servo signal based on the reference surface servo error signal.

(4) The recording apparatus according to any of (1) to (3), wherein the light irradiation and receiving unit is configured to irradiate main adjacent servo light and sub-adjacent servo light as the adjacent servo light, and to individually receive the main adjacent servo light and reflected light from the recording layer of the sub-adjacent servo light, the sub-adjacent servo light having a position in the disc circumferential direction symmetrical to a position in the disc circumferential direction of the main adjacent servo light while the position in the disc circumferential direction of the recording light is interposed between the main adjacent servo light and the sub-adjacent servo light, and
wherein the tracking servo signal generation unit is configured to obtain the corrected servo error signal through an operation of a light receiving signal for the main adjacent servo light and a light receiving signal for the sub-adjacent servo light.

(5) The recording apparatus according to (4), wherein the tracking servo signal generation unit is configured to obtain the corrected servo error signal through an operation for providing a first servo error signal obtained from the light receiving signal of the main adjacent servo light with ½ of a difference between the first servo error signal and a second servo error signal obtained from the light receiving signal of the sub-adjacent servo light.

(6) The recording apparatus according to any of (1) to (3), wherein the tracking servo signal generation unit is configured to obtain the corrected servo error signal by providing a servo error signal based on the light receiving signal for the adjacent servo light with a position difference in the disc radial direction between a current spot position of the adjacent servo light and a spot position at a time point at which the adjacent servo light and the current recording light are in a same position in the disc circumferential direction.

(7) The recording apparatus according to (6),
wherein the light irradiation and receiving unit is configured to irradiate the adjacent servo light such that the position in the disc circumferential direction of the adjacent servo light is advanced to be earlier than the recording light in a track travel direction, and
wherein the tracking servo signal generation unit is configured to obtain the corrected servo error signal by adding the position difference to a servo error signal at the time point at which the adjacent servo light and the current recording light are in the same position in the disc circumferential direction.

(8) The recording apparatus according to (6),
wherein the light irradiation and receiving unit is configured to irradiate the adjacent servo light such that the position in the disc circumferential direction of the adjacent servo light follows the recording light in the track travel direction, and
wherein the tracking servo signal generation unit is configured to obtain the corrected servo error signal by adding the position difference to a servo error signal for the current adjacent servo light.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
a light irradiation and receiving unit configured to irradiate recording light for performing mark recording to a recording layer and an adjacent servo light for an adjacent track servo onto an optical disc recording medium having the recording layer through a common objective lens, and to receive reflected light from the recording layer of the adjacent servo light, the adjacent servo light having an irradiation position different from a position in a disc circumferential direction of the recording light and being separated from the recording light by a predetermined distance in a disc radial direction;

a tracking mechanism configured to drive the objective lens in a tracking direction which is the disc radial direction;

a tracking servo signal generation unit configured to obtain a corrected servo error signal as a servo error signal based on a light receiving signal for the adjacent servo light, and to generate a tracking servo signal using the corrected servo error signal, the corrected servo error signal being obtained when the adjacent servo light has been irradiated in a same position in the disc circumferential direction as a position of the recording light; and a tracking driving unit configured to drive the tracking mechanism based on the tracking servo signal.

2. The recording apparatus according to claim 1, wherein the optical disc recording medium has a reference surface provided with a position director formed in a depth position different from the position of the recording light, wherein the light irradiation and receiving unit is configured to irradiate the recording light, the adjacent servo light, and reference surface servo light for performing position control based on the position director formed in the reference surface onto the optical disc recording medium through the common objective lens, and to individually receive the reflected light from the recording layer of the adjacent servo light and reflected light from the reference surface of the reference surface servo light, and wherein the tracking servo signal generation unit is configured to generate the tracking servo signal using the corrected servo error signal, and a reference surface servo error signal obtained based on a light receiving signal for the reference surface servo light obtained by the light irradiation and receiving unit.

3. The recording apparatus according to claim 2, wherein the tracking servo signal generation unit is configured to provide a servo control signal based on the corrected servo error signal to a tracking servo loop for generating a tracking servo signal based on the reference surface servo error signal.

4. The recording apparatus according to claim 1, wherein the light irradiation and receiving unit is configured to irradiate main adjacent servo light and sub-adjacent servo light as the adjacent servo light, and to individually receive the main adjacent servo light and reflected light from the recording layer of the sub-adjacent servo light, the sub-adjacent servo light having a position in the disc circumferential direction symmetrical to a position in the disc circumferential direction of the main adjacent servo light while the position in the disc circumferential direction of the recording light is interposed between the main adjacent servo light and the sub-adjacent servo light, and wherein the tracking servo signal generation unit is configured to obtain the corrected servo error signal through an operation of a light receiving signal for the main adjacent servo light and a light receiving signal for the sub-adjacent servo light.

5. The recording apparatus according to claim 4, wherein the tracking servo signal generation unit is configured to obtain the corrected servo error signal through an operation for providing a first servo error signal obtained from the light receiving signal of the main adjacent servo light with ½ of a difference between the first servo error signal and a second servo error signal obtained from the light receiving signal of the sub-adjacent servo light.

6. The recording apparatus according to claim 1, wherein the tracking servo signal generation unit is configured to obtain the corrected servo error signal by providing a servo error signal based on the light receiving signal for the adjacent servo light with a position difference in the disc radial direction between a current spot position of the adjacent servo light and a spot position at a time point at which the adjacent servo light and the current recording light are in a same position in the disc circumferential direction.

7. The recording apparatus according to claim 6, wherein the light irradiation and receiving unit is configured to irradiate the adjacent servo light such that the position in the disc circumferential direction of the adjacent servo light is advanced to be earlier than the recording light in a track travel direction, and wherein the tracking servo signal generation unit is configured to obtain the corrected servo error signal by adding the position difference to a servo error signal at the time point at which the adjacent servo light and the current recording light are in the same position in the disc circumferential direction.

8. The recording apparatus according to claim 6, wherein the light irradiation and receiving unit is configured to irradiate the adjacent servo light such that the position in the disc circumferential direction of the adjacent servo light follows the recording light in the track travel direction, and wherein the tracking servo signal generation unit is configured to obtain the corrected servo error signal by adding the position difference to a servo error signal for the current adjacent servo light.

9. A recording method comprising:

irradiating recording light for performing mark recording to a recording layer and adjacent servo light for an adjacent track servo onto an optical disc recording medium having the recording layer through a common objective lens, and receiving reflected light from the recording layer of the adjacent servo light, the adjacent servo light having an irradiation position different from a position in a disc circumferential direction of the recording light and being separated from the recording light by a predetermined distance in a disc radial direction;

obtaining a corrected servo error signal as a servo error signal based on a light receiving signal for the adjacent servo light, and generating a tracking servo signal using the corrected servo error signal, the corrected servo error signal being obtained when the adjacent servo light has been irradiated in a same position in the disc circumferential direction as a position of the recording light; and performing a tracking servo for driving the objective lens in a tracking direction, which is the disc radial direction, based on the tracking servo signal, and performing mark recording to the recording layer using the recording light.

* * * * *